United States Patent
Kobayashi

(10) Patent No.: US 11,644,740 B2
(45) Date of Patent: May 9, 2023

(54) OPTICAL SYSTEM AND IMAGE PICKUP APPARATUS HAVING THE SAME

(71) Applicant: CANON KABUSHIKI KAISHA, Tokyo (JP)

(72) Inventor: Kana Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 162 days.

(21) Appl. No.: 17/123,170

(22) Filed: Dec. 16, 2020

(65) Prior Publication Data

US 2021/0232038 A1    Jul. 29, 2021

(30) Foreign Application Priority Data

Jan. 24, 2020 (JP) .............................. JP2020-010204

(51) Int. Cl.
  *G02B 17/08* (2006.01)
  *G03B 37/00* (2021.01)
  *G02B 17/06* (2006.01)
  *G02B 13/18* (2006.01)

(52) U.S. Cl.
  CPC ............. *G03B 37/00* (2013.01); *G02B 17/06* (2013.01); *G02B 13/18* (2013.01)

(58) Field of Classification Search
  CPC ....... G02B 13/06; G02B 17/08; G02B 17/082
  See application file for complete search history.

(56) References Cited

U.S. PATENT DOCUMENTS

| | | | | | |
|---|---|---|---|---|---|
| 5,473,474 A | * | 12/1995 | Powell | ................. | G02B 17/061 359/725 |
| 7,019,918 B2 | * | 3/2006 | Wallerstein | ............. | G02B 3/04 359/728 |
| 7,130,114 B2 | * | 10/2006 | Kurioka | ............. | G02B 17/0663 359/857 |
| 7,245,443 B2 | * | 7/2007 | Togino | ................... | G02B 13/06 359/725 |
| 7,362,517 B2 | * | 4/2008 | Togino | ................... | G02B 13/06 359/720 |
| 7,408,703 B2 | * | 8/2008 | Matsuki | ................. | G02B 13/06 359/364 |
| 7,463,431 B2 | * | 12/2008 | Togino | ................... | G02B 13/06 359/725 |
| 7,542,218 B2 | * | 6/2009 | Togino | ................... | G02B 13/06 359/725 |

(Continued)

FOREIGN PATENT DOCUMENTS

| | | | | |
|---|---|---|---|---|
| CN | 204993599 U | * | 1/2016 | |
| JP | 2006053219 A | * | 2/2006 | ............. G02B 13/06 |

(Continued)

*Primary Examiner* — Christopher Stanford
(74) *Attorney, Agent, or Firm* — Carter, DeLuca & Farrell LLP

(57) ABSTRACT

An optical system includes an incident part, a first reflective surface, a second reflective surface, a third reflective surface, and an exit part. The incident part is rotationally symmetric around a central axis. Incident light from the incident part intersects the central axis and enters the first reflective surface. Reflected light from the first reflective surface intersects the central axis and enters the second reflective surface. Reflected light from the second reflective surface enters the third reflective surface.

19 Claims, 12 Drawing Sheets

(56) References Cited

U.S. PATENT DOCUMENTS

| | | | | |
|---|---|---|---|---|
| 7,800,839 | B2* | 9/2010 | Togino | G02B 13/06 |
| | | | | 359/725 |
| 8,072,693 | B2* | 12/2011 | Togino | G02B 13/06 |
| | | | | 359/725 |
| 8,254,038 | B2* | 8/2012 | Togino | A61B 1/00096 |
| | | | | 359/725 |
| 8,289,630 | B2* | 10/2012 | Togino | G02B 17/086 |
| | | | | 359/731 |
| 9,148,565 | B2* | 9/2015 | Glasse | H04N 5/23238 |
| 10,809,506 | B2* | 10/2020 | Amano | G02B 17/0816 |
| 2013/0057971 | A1* | 3/2013 | Zhao | G02B 13/06 |
| | | | | 359/731 |

FOREIGN PATENT DOCUMENTS

| | | | | | |
|---|---|---|---|---|---|
| JP | 2006058412 | A | * | 3/2006 | G02B 13/06 |
| JP | 2006154364 | A | * | 6/2006 | |
| JP | 2006220603 | A | * | 8/2006 | |
| JP | 2006-259660 | A | | 9/2006 | |
| JP | 2010020066 | A | * | 1/2010 | |
| JP | 2010-250253 | A | | 11/2020 | |
| WO | WO-2009041288 | A1 | * | 4/2009 | A61B 1/00096 |

* cited by examiner

OPTICAL SYSTEM AND IMAGE PICKUP APPARATUS HAVING THE SAME

BACKGROUND OF THE INVENTION

Field of the Invention

The present invention relates to an optical system, which is suitable for a digital video camera, a digital still camera, a broadcasting camera, a digital cinema, a projection apparatus, and the like.

Description of the Related Art

A reflective optical system having a plurality of rotationally symmetrically reflective surfaces around a central axis has conventionally been known as an imaging optical system configured to obtain an image of 360° in all directions (entire circumference).

Japanese Patent Laid-Open No. ("JP") 2010-250253 discloses an optical system including a transparent medium having two transmissive surfaces and two reflective surfaces that are rotationally symmetric around the central axis. In the optical system of JP 2010-250253, light incident on the transparent medium from the first transmissive surface is reflected on the first reflective surface toward a side opposite to the image, is reflected on the second reflective surface toward the image side, intersects the central axis, and is exited from the transparent medium through the second transmissive surface.

JP 2006-259660 discloses an optical system including a transparent medium having two transmissive surfaces and three reflective surfaces that are rotationally symmetrical around the central axis. In the optical system of JP 2006-259660, light incident on the transparent medium from the first transmissive surface is reflected on the first reflective surface toward the image side, is reflected on the second reflective surface toward a side opposite to the image, is reflected on the third reflective surface toward the image side, and is exited from the transparent medium through the second transmissive surface. Such an optical path includes only one side with respect to the central axis.

Image pickup apparatuses have recently been required to be smaller and have higher image quality. In order to obtain high-quality images, it is necessary to build an optical system compatible with a large image sensor (image pickup element). When the optical systems of JPs 2010-250253 and 2006-259660 are used as the optical system compatible with the large-sized image sensor, the transparent medium becomes large and it becomes difficult to reduce the size of the optical system. Further, the optical system of JP 2006-259660 is hard to process because it is necessary to form a cavity near the central axis.

In order to obtain high optical performance over all 360° directions while reducing the size of the optical system, it is necessary to properly arrange the reflective surfaces rotationally symmetrical with respect to the central axis, and to properly set powers to the reflective surfaces, incident part, and exit part.

SUMMARY OF THE INVENTION

The present invention provides a compact optical system and an image pickup apparatus having the same, each of which can provide a 360° omnidirectional and high quality image.

An optical system according to one aspect of the present invention includes an incident part, a first reflective surface, a second reflective surface, a third reflective surface, and an exit part. The incident part is rotationally symmetric around a central axis. Incident light from the incident part intersects the central axis and enters the first reflective surface. Reflected light from the first reflective surface intersects the central axis and enters the second reflective surface. Reflected light from the second reflective surface enters the third reflective surface.

An optical system according to another aspect of the present invention includes an incident part, a first reflective surface, a second reflective surface, a third reflective surface, and an exit part. The exit part is rotationally symmetric around a central axis. Reflected light from the first reflective surface enters the second reflective surface. Reflected light from the second reflective surface intersects the central axis and enters the third reflective surface. Reflected light from the third reflective surface intersects the central axis and enters the exit part.

An image pickup apparatus having one of the above optical systems also constitutes another aspect of the present invention.

Further features of the present invention will become apparent from the following description of exemplary embodiments with reference to the attached drawings.

DESCRIPTION OF THE EMBODIMENTS

Figure 1:
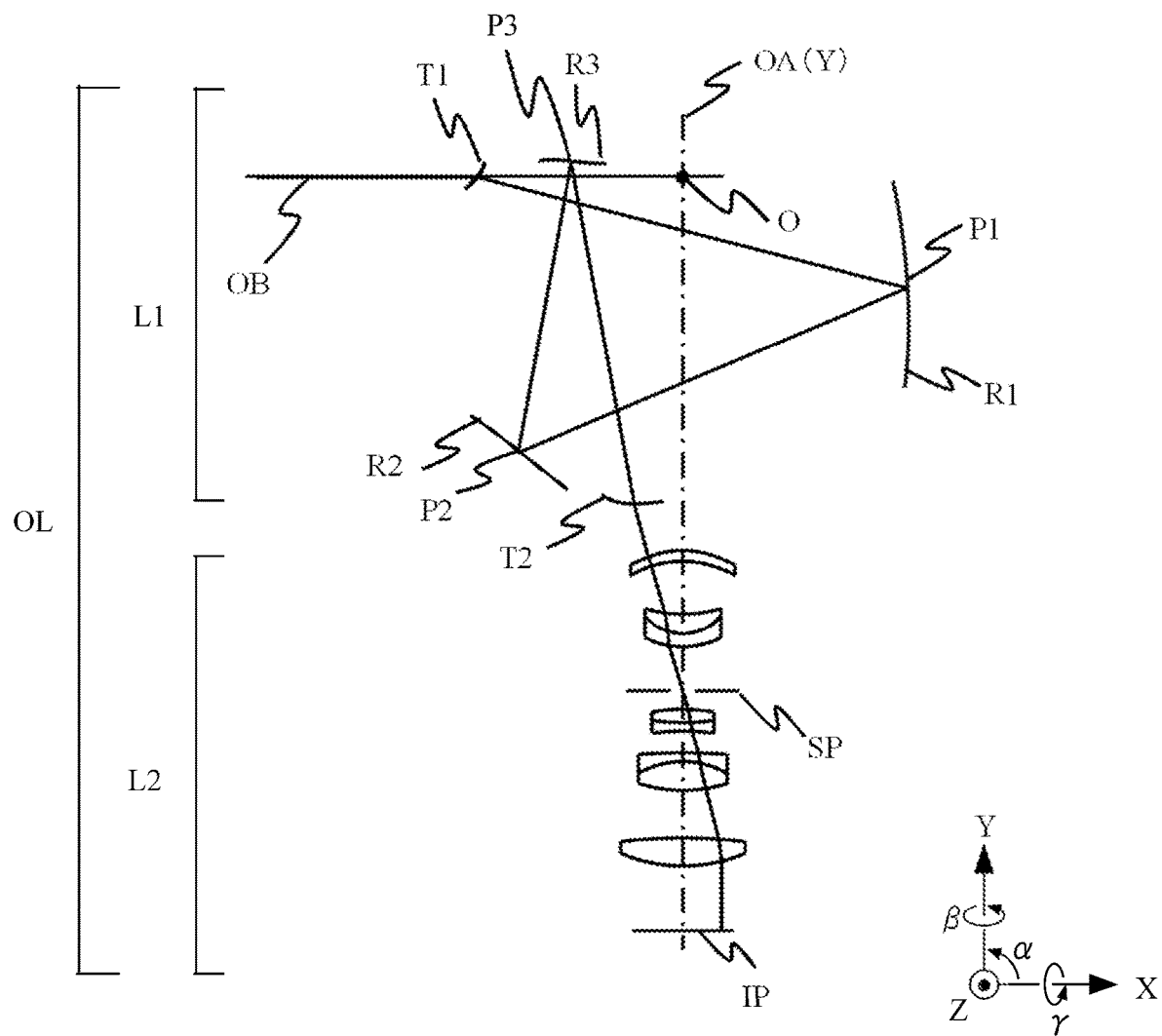
FIG. 1 is a diagram for explaining an optical system according to one embodiment of the present invention.

Referring now to the accompanying drawings, a detailed description will be given of embodiments according to the present invention. Corresponding elements in respective figures will be designated by the same reference numerals, and a duplicate description thereof will be omitted.

FIG. 1 is a diagram for explaining an optical system OL according to one embodiment of the present invention. The optical system OL according to each example is an optical system used in an image pickup apparatus, such as a digital video camera, a digital still camera, a broadcasting camera, a film-based camera, and a surveillance camera. The optical system OL according to each example can also be used as a projection optical system for a projection apparatus (projector). That is, the optical system OL forms an image having a 360° omnidirectional angle of view on an image plane IP, or projects an image disposed on the image plane IP at a 360° omnidirectional angle of view.

In this embodiment, a direction of a central axis OA of the optical system OL is set to a Y-axis direction, and an X-Y plane is set to the inside of the paper plane in FIG. 1. In FIG. 1, the negative side in the X-axis direction is the enlargement side (object side), and the negative side in the Y-axis direction is the reduction side (image side). In the optical system OL that forms an image on a sensor such as CMOS with an aspect ratio, for example, the axis orthogonal to the central axis OA and parallel to the long side direction of the image plane IP is set to the X axis, and the axis orthogonal to the central axis OA and parallel to the short side direction of the image plane IP is set to the Z axis. When the image plane IP is a square, the X axis and the Z axis can be arbitrarily defined so that the X axis and the Z axis are orthogonal to each other on the image plane IP. An origin O of the optical system OL is set at a point where an extended principal ray (reference axis light ray) OB of light that enters the incident part T1 parallel to the X axis (incident at a vertical angle of 0° in the X-Y section) orthogonally intersects the central axis OA.

SP represents an aperture stop (diaphragm) that determines (limits) a luminous flux of an open F-number (Fno). Providing the aperture stop SP can prevent flare light from entering the Z-X section, and easily achieve high image quality. Disposed on the image plane IP is an imaging plane of a solid-state image sensor (photoelectric conversion element), such as a CCD sensor and a CMOS sensor, which receives an image formed by an imaging optical system when the optical system according to each example is used as an imaging optical system for a digital still camera or a digital video camera. When the optical system according to each example is used as an imaging optical system for a film-based camera, a photosensitive plane corresponding to a film plane is placed on the image plane IP.

The optical system OL according to each example includes a front unit L1 having an incident part T1, a first reflective surface R1, a second reflective surface R2, a third reflective surface R3, and an exit part T2. The front unit L1 is a transparent medium using a glass material or a resin material, or a shell body that defines a predetermined internal space (cavity). The incident part T1 is rotationally symmetrical around the central axis OA. Each of the first to third reflective surfaces and the exit part may be rotationally symmetrical about the central axis OA. The incident light from the incident part T1 intersects the central axis OA and enters the first reflective surface R1. The reflected light from the first reflective surface R1 intersects the central axis OA and enters the second reflective surface R2. The reflected light from the second reflective surface R2 enters the third reflective surface R3.

The optical system OL according to each example has at least three reflective surfaces, and the front unit L1 can easily become compact by increasing the light deflecting (or bending) number, as compared with the optical system having two reflective surfaces. In addition, since the power of the reflective surface can be dispersed, the image quality can be easily improved.

The incident light from the incident part T1 is made to intersect the central axis OA and introduced to the first reflective surface R1, and the reflected light from the first reflective surface R1 is made to intersect the central axis OA and introduced to the second reflective surface R2. Thereby, a distance from the incident part T1 to the first reflective surface R1 can be made shorter, and the optical system OL can be easily made compact.

As described above, by properly setting the incident part T1, the plurality of reflective surfaces, the exit part T2, and the optical path of the light flux, the optical system OL can be made compact and high optical performance can be achieved in all directions of 360°.

In the optical system OL according to each example, the following conditional expression (1) may be satisfied $$0.01 < A/B < 0.37 \tag{1}$$

where A is a distance of the principal ray OB traveling from the incident part T1 to the first reflective surface R1, and B is a distance of the principal ray OB traveling from the incident part T1 to the exit part T2.

The conditional expression (1) defines a ratio of the distance A of the principal ray OB traveling from the incident part T1 to the first reflective surface R1, to the distance B of the principal ray OB traveling from the incident part T1 to the exit part T2. As described above, the principal ray OB is a principal ray of light that enters the incident part T1 parallel to the X axis (at a vertical angle of view of 0° in the X-Y section). If the distance A of light traveling from the incident part T1 to the first reflective surface R1 becomes long and the value is higher than the upper limit in the conditional expression (1), the front unit becomes undesirably large. If the value is lower than the lower limit in the conditional expression (1), the power of the first reflective surface R1 in the Z-X direction becomes too strong and it becomes difficult to correct the astigmatism.

The numerical range of the conditional expression (1) may be that of the following conditional expression (1a).

$$0.05 < A/B < 0.36 \tag{1a}$$

By satisfying the conditional expression (1a), the ratio of the distances A and B becomes more appropriate, and the optical system OL can easily become compact.

The numerical range of the conditional expression (1) may be set to the numerical range of the following conditional expression (1b).

$$0.10 < A/B < 0.30 \tag{1b}$$

Figure 2:
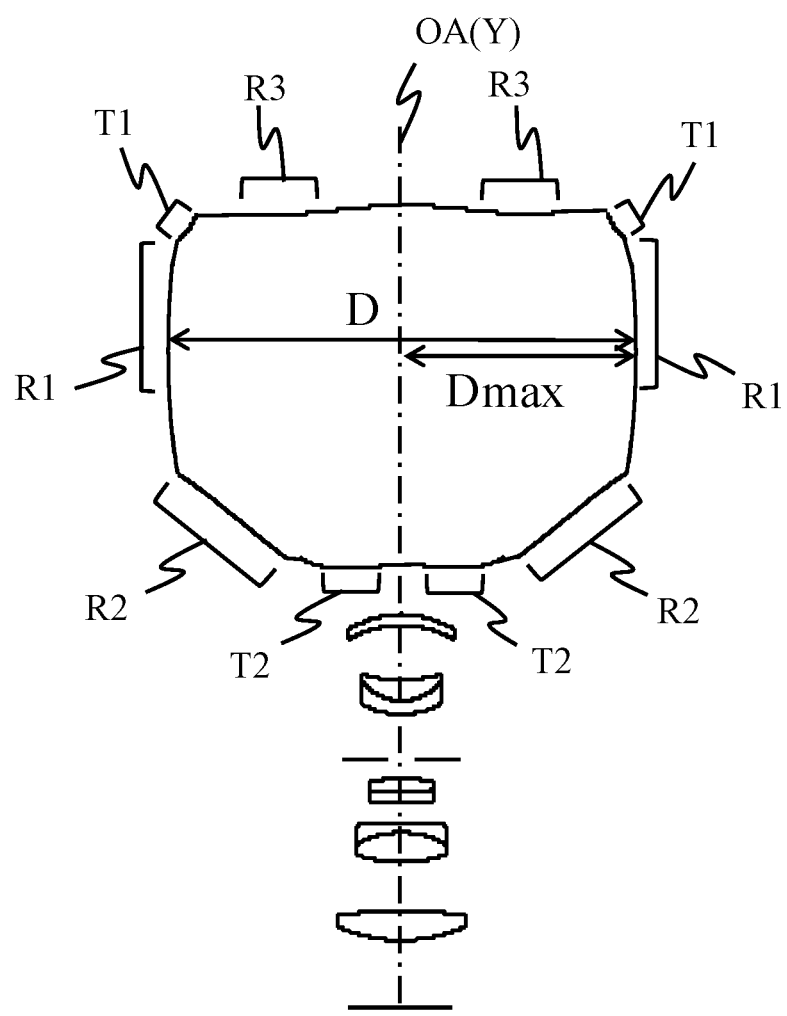
FIG. 2 is an explanatory diagram of a maximum diameter of the optical system.

The optical system OL according to each example may satisfy the following conditional expression (2) where D is a maximum diameter of the optical system OL (outer diameter of the front unit L1) and Dr is an image circle. FIG. 2 is an explanatory diagram of the maximum diameter D of the optical system OL. The maximum diameter D is expressed as 2×Dmax where Dmax is a maximum value of the X-axis coordinate.

$$0.01 < D/Dr < 5.80 \tag{2}$$

The conditional expression (2) defines a ratio of the maximum diameter D of the optical system OL to the image circle Dr. If the value is higher than the upper limit in the conditional expression (2), the size of the front unit becomes undesirably large. If the value is lower than the lower limit in the conditional expression (2), the power in the Z-X direction becomes too strong and it becomes difficult to correct the astigmatism.

The numerical range of the conditional expression (2) may be that of the following conditional expression (2a).

$$1.00 < D/Dr < 5.50 \tag{2a}$$

By satisfying the conditional expression (2a), the ratio of the image circle Dr to the maximum diameter D of the optical system OL becomes more appropriate, and the structure can be easily made compact while correcting the astigmatism.

The numerical range of the conditional expression (2) may be that of the following conditional expression (2b).

$$3.00 < D/Dr < 5.20 \tag{2b}$$

The optical system OL according to each example includes a rear unit L2 disposed on the image side of the exit part T2 and including a rotationally symmetric bending optical system around the central axis OA. By generating the aberration so as to cancel the astigmatism generated in the front unit L1, it becomes easy to suppress the astigmatism in the optical system OL.

In the optical system OL according to each example, a position P2 where the principal ray OB intersects the second reflective surface R2 may be located on the image side of a position P1 where the principal ray OB intersects the first reflective surface R1. A light ray OBU incident on the incident part T1 from a side opposite to the image of the principal ray OB can suppress the spread of the luminous flux when entering the first reflective surface R1, and it becomes easy to avoid interference of the effective diameter of the surface. Thereby, an observation angle of view can be increased in the X-Y sectional direction while the size of the optical system OL is made smaller.

In the optical system OL according to each example, the position P1 where the principal ray OB intersects the first reflective surface R1 may be located on the image side of the position Pn where the principal ray OB intersects the reflective surface that introduces the reflected light to the exit part T2. Here, the reflective surface that introduces the reflected light to the exit part T2 is a reflective surface disposed closest to the reduction end among the reflective surfaces included in the front unit L1. This configuration can easily avoid interference with the effective diameter of the surface, and maintain wide the observation angle of view in the X-Y sectional direction. Since the incident angle on the rear unit L2 with respect to the central axis OA can be suppressed, the off-axis aberration, such as the astigmatism, can be suppressed.

In the optical system OL according to each example, the light incident on the incident part T1 may be imaged in an annular shape at a position deviated from the central axis OA of the image plane IP. This enables a single sensor to provide 360° omnidirectional photography.

In the optical system OL according to each example, at least one of the incident part T1, the plurality of reflective surfaces, and the exit part T2 may have a free-form surface by rotating a line segment having an arbitrary shape including an odd-order term around the central axis OA. Thereby, the optical system OL having a high resolving power and corrected eccentric aberration can be provided, and the optical system OL can be easily made smaller.

In the optical system OL according to each example, the number of intermediate images in the X-Y section is different from that in the Z-X section. Thereby, it becomes easy to mitigate the power of the X-Y section and to correct the curvature of field.

The optical system OL according to each example may satisfy the following conditional expression (3):

$$0.35 < |fxy/fzx| < 1.20 \tag{3}$$

where fxy is a focal length of the optical system OL in the X-Y section and fzx is a focal length of the optical system OL in the Z-X section.

The conditional expression (3) defines a ratio of the focal length fxy of the optical system OL in the X-Y section to the focal length fzx of the optical system OL in the Z-X section. If the value is higher than the upper limit in the conditional expression (3), the focal length of the optical system OL in the X-Y section becomes too long as compared to the focal length of the optical system OL in the Z-X section, so it is difficult to maintain large the vertical angle of view. If the value is lower than the lower limit in the conditional expression (3), the focal length of the optical system OL in the X-Y section becomes too short as compared to the focal length of the optical system OL in the Z-X section, and it becomes difficult to correct the curvature of field and astigmatism.

The numerical range of the conditional expression (3) may be that of the following conditional expression (3a).

$$0.40 < |fxy/fzx| < 1.10 \tag{3a}$$

By satisfying the conditional expression (3a), the ratio of the focal length fzx of the optical system OL in the Z-X section to the focal length fxy of the optical system OL in the X-Y section becomes more appropriate, the vertical image of view can be made wider, and it becomes easy to correct the curvature of field and astigmatism.

The numerical range of the conditional expression (3) may be that of the following conditional expression (3b).

$$0.95 < |fxy/fzx| < 1.05 \tag{3b}$$

The optical system OL according to each example may satisfy the following conditional expression (4) where fL2 is a focal length of the rear unit L2.

$$0.05 < |fxy/fL2| < 5.00 \tag{4}$$

The conditional expression (4) defines a ratio of the focal length fxy of the optical system OL in the X-Y section to the focal length fL2 of the rear unit L2. If the value is higher than the upper limit in the conditional expression (4), the focal length fL2 of the rear unit L2 becomes too short relative to the focal length fxy of the optical system OL in the X-Y section, and it becomes difficult to correct the curvature of field and astigmatism. If the value is lower than the lower limit in the conditional expression (4), the focal length fL2 of the rear unit L2 becomes too long relative to the focal length fry of the optical system OL in the X-Y section, it becomes difficult to correct the chromatic aberration, and at the same time the chromatic aberration undesirably increases in the Y-axis direction.

The numerical range of the conditional expression (4) may be that of the following conditional expression (4a).

$$0.08 < |fxy/fL2| < 2.00 \tag{4a}$$

By satisfying the conditional expression (4a), the ratio of the focal length fL2 of the rear unit L2 to the focal length fry of the optical system OL in the X-Y section becomes more appropriate, and the curvature of field and chromatic aberration can be easily corrected.

The numerical range of the conditional expression (4) may be that of the following conditional expression (4b).

$$0.10<|fxy/fL2|<1.00 \quad (4b)$$

The optical system OL according to each example may satisfy the following conditional expression (5).

$$0.05<|fzx/fL2|<5.00 \quad (5)$$

The conditional expression (5) defines a ratio of the focal length fzx of the optical system OL in the Z-X section to the focal length fL2 of the rear unit L2. If the value is higher than the upper limit in the conditional expression (5), the focal length fL2 of the rear unit L2 becomes too short relative to the focal length fzx of the optical system OL in the Z-X section, and it becomes difficult to correct the curvature of field and astigmatism. If the value is lower than the lower limit in the conditional expression (5), the focal length fL2 of the rear unit L2 becomes too long relative to the focal length fzx of the optical system OL in the Z-X section, it becomes difficult to correct the chromatic aberration, and at the same time the chromatic aberration undesirably increases in the Y-axis direction.

The numerical range of the conditional expression (5) may be that of the following conditional expression (5a).

$$0.08<|fzx/fL2|<2.00 \quad (5a)$$

By satisfying the conditional expression (5a), the ratio of the focal length fL2 of the rear unit L2 to the focal length fzx of the optical system OL in the Z-X section becomes more appropriate, and the curvature of field and chromatic aberration can be easily corrected.

The numerical range of the conditional expression (5) may be that of the following conditional expression (5b).

$$0.10<|fzx/fL2|<1.00 \quad (5b)$$

In the optical system OL according to each example, the incident part T1 may be disposed between the first reflective surface R1 and the reflective surface for introducing the reflected light to the exit part T2 in the Y-axis direction (direction parallel to the central axis OA). This facilitates a miniaturization of the front unit L1 while avoiding interference with the effective diameter of the surface.

The optical system OL according to each example may have an aperture EP that limits light incident on the incident part T1 in the X-Y section and is disposed rotationally symmetrically with respect to the central axis OA. Thereby, flare light can be prevented from entering the X-Y section, and the image quality can be easily improved.

In the optical system OL according to each example, the incident part T1, the plurality of reflective surfaces, and the exit part T2 may be rotationally symmetric around the central axis OA and provided in the transparent medium L which has a refractive index greater than 1. Thereby, the relative eccentricity of the reflective surface can be suppressed, and it becomes easy to suppress manufacturing errors.

In the optical system OL according to each example, the incident part T1, the plurality of reflective surfaces, and the exit part T2 may be provided in a shell body L that defines a predetermined internal space. Since the inside of the shell is hollow, the weight and cost can be lower than those in a case where the shell is made of a glass material or a resin material.

In the optical system OL according to each example, the incident part T1 may have a refractive power. Thereby, it is possible to suppress the distance A of the principal ray OB traveling from the incident part T1 to the first reflective surface R1, and the front unit L1 can be made smaller.

In the optical system OL according to each example, the exit part T2 may have a refractive power. Thereby, the incident angle of the light incident on the rear unit L2 can be suppressed, and the aberration can be easily corrected in the optical system OL.

Example 1

Figure 3:
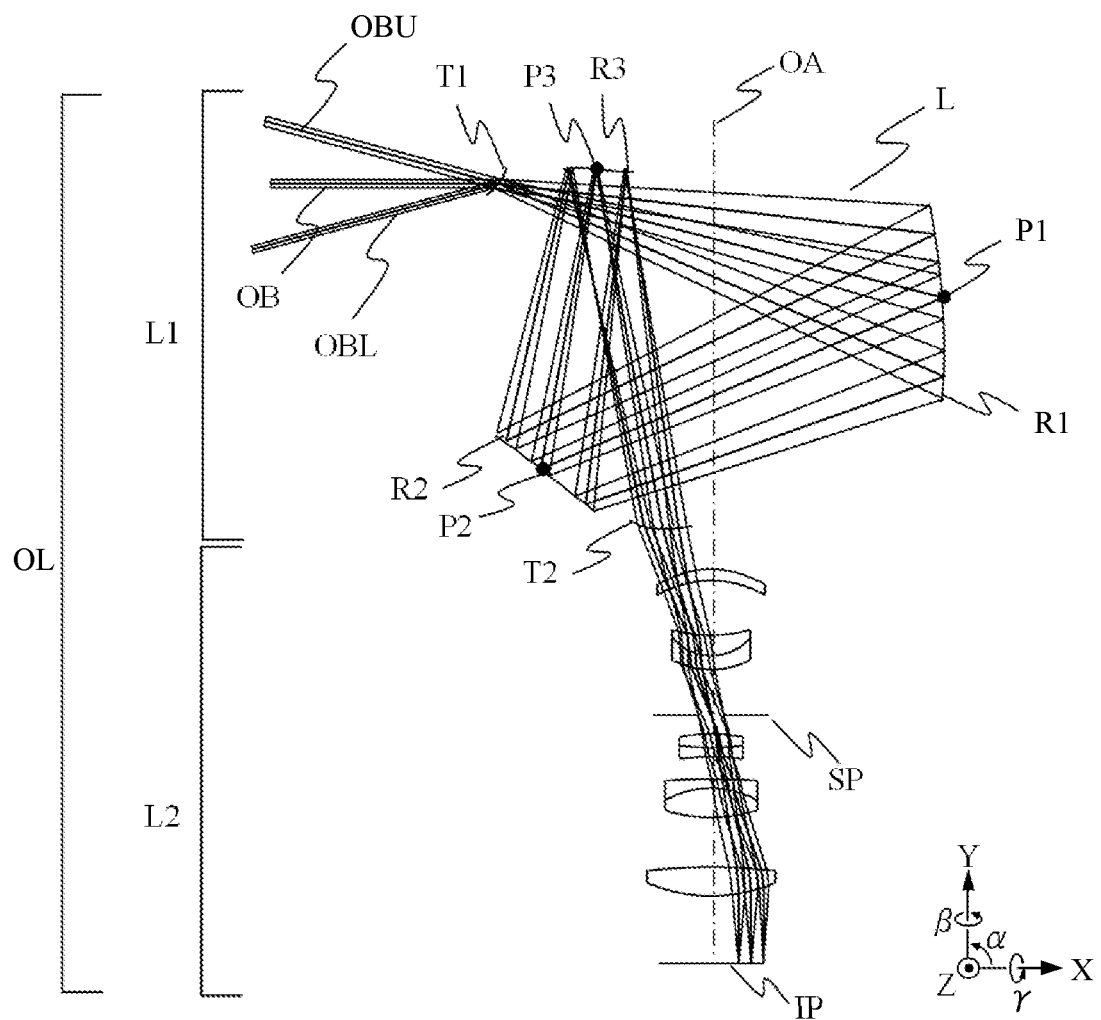
FIG. 3 is an X-Y sectional view in an optical system according to Example 1 in an in-focus state on infinity.
Figure 4:
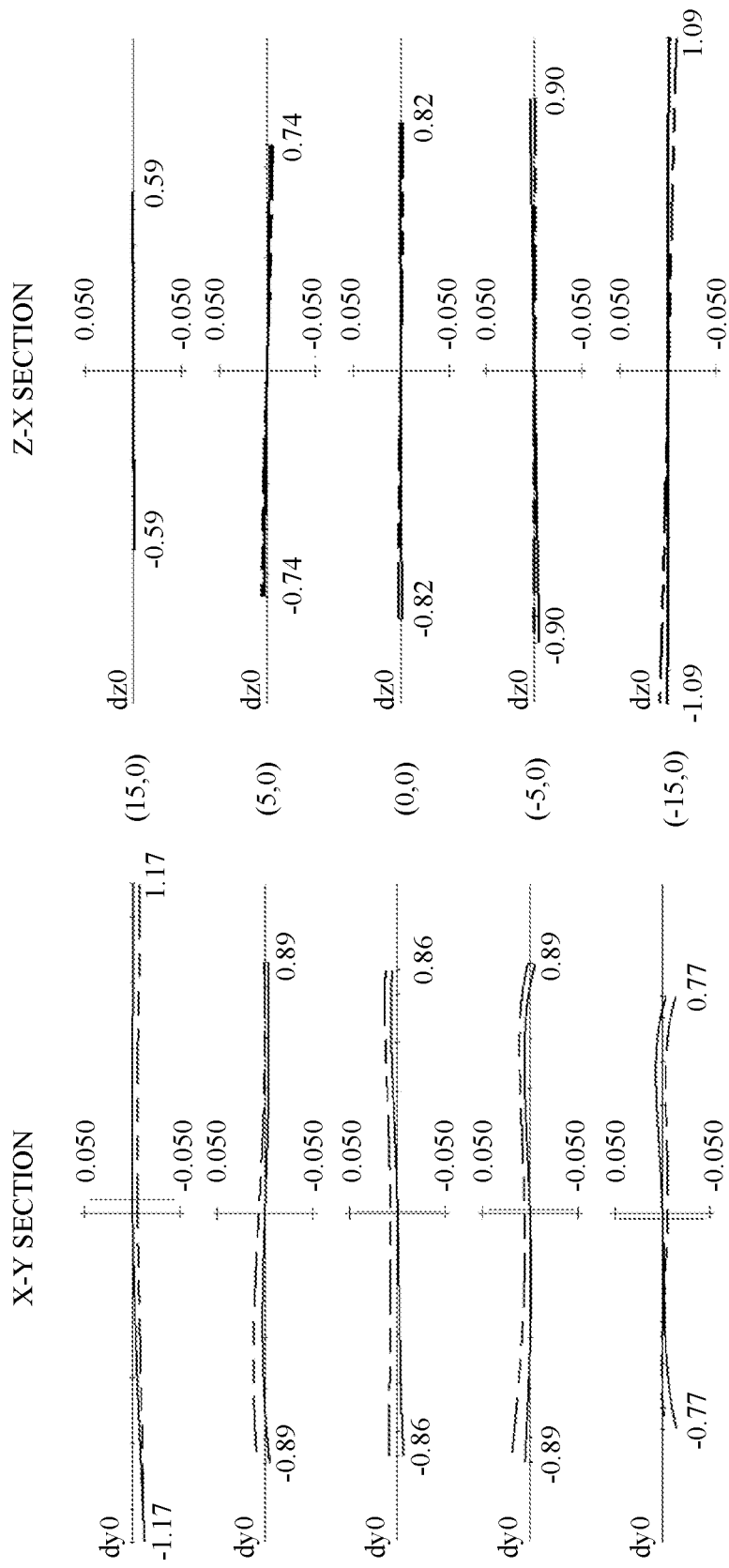
FIG. 4 is a lateral aberrational diagram of the optical system according to Example 1 in the in-focus state on infinity.

FIG. 3 is an X-Y sectional view in an optical system OL according to this example in an in-focus state on infinity. FIG. 4 is a lateral aberrational diagram of the optical system OL according to this example in the in-focus state on infinity. In the lateral aberrational diagram, the numerical value shown at the center indicates (an angle of the incident light ray on the incident part T1 in the X-Y section, an angle of the incident light ray on the incident part T1 in the Z-X section), and left and right graphs show lateral aberrations at the angles of the incident light ray. A solid line represents the d-line (wavelength 587.56 nm), and a dotted line represents the g-line (wavelength 435.8 nm).

The optical system OL includes, in order from the enlargement side to the reduction side, a front unit L1 and a rear unit L2, each of which is rotationally symmetrical around the central axis OA. The front unit L1 has a transparent medium L that is rotationally symmetric about the central axis OA and has a refractive index greater than 1. The transparent medium L includes, in order from the enlargement side to the reduction side, an incident part T1, a first reflective surface R1, a second reflective surface R2, a third reflective surface R3, and an exit part T2. The incident part T1, the first reflective surface R1, the second reflective surface R2, the third reflective surface R3, and the exit part T2 each have a free-form surface with the central axis OA as a reference axis. The incident part T1 and the exited part T2 each have a refractive surface. The rear unit L2 has an aspherical lens which is coaxial with the central axis OA and has a convex surface facing the side opposite to the image, and an aperture stop (diaphragm) SP.

The incident light from the incident part T1 intersects the central axis OA and enters the first reflective surface R1. The reflected light from the first reflective surface R1 intersects the central axis OA and enters the second reflective surface R2. The reflected light from the second reflective surface R2 enters the third reflective surface R3 without intersecting the central axis OA. The reflected light from the third reflective surface R3 is exited from the exit part T2.

The position P2 where the principal ray OB intersects the second reflective surface R2 is located on the image side of the position P1 where the principal ray OB intersects the first reflective surface R1. The position P1 where the principal ray OB intersects the first reflective surface R1 is located on the image side of the position P3 where the principal ray OB intersects the third reflective surface R3 that introduces the reflected light to the exit part T2. The incident part T1 is disposed between the first reflective surface R1 and the third reflective surface R3 in the Y-axis direction.

The light emitted from the exit part T2 passes through the rear unit L2 and forms an annular image at a position deviated from the central axis OA of the image plane IP.

The light ray OBU incident on the incident part T1 from the side opposite to the image of the principal ray OB is imaged inside the position where the principal ray OB is imaged on the image plane IP. The ray OBL incident on the incident part T1 from the image side of the principal ray OB is imaged outside the position where the principal ray OB is imaged on the image plane IP.

The incident light from the incident part T1 forms an intermediate image once in the X-Y section and intermediate images twice in the Z-X section.

Example 2

Figure 5:
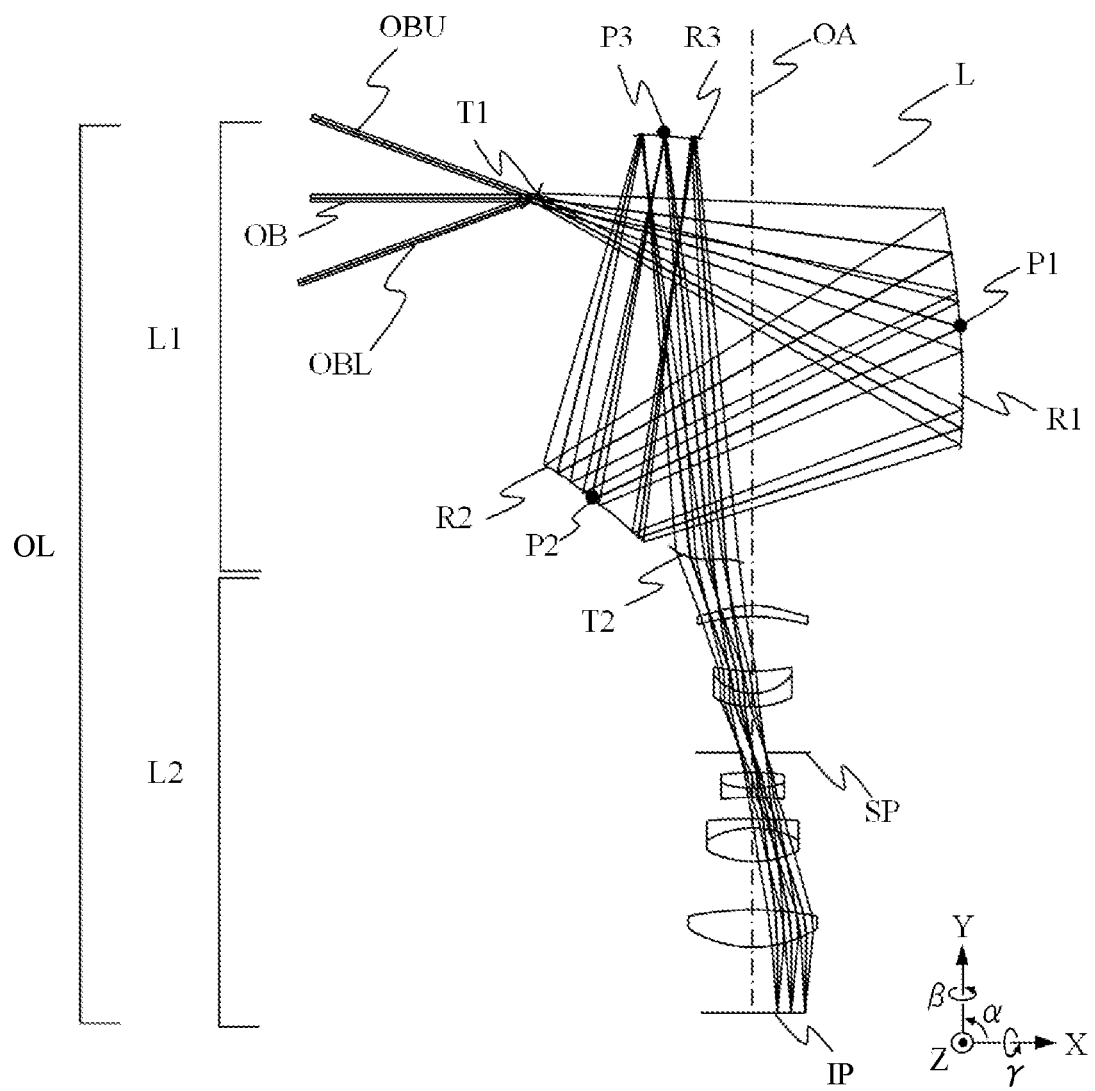
FIG. 5 is an X-Y sectional view in an optical system according to Example 2 in an in-focus state on infinity.
Figure 6:
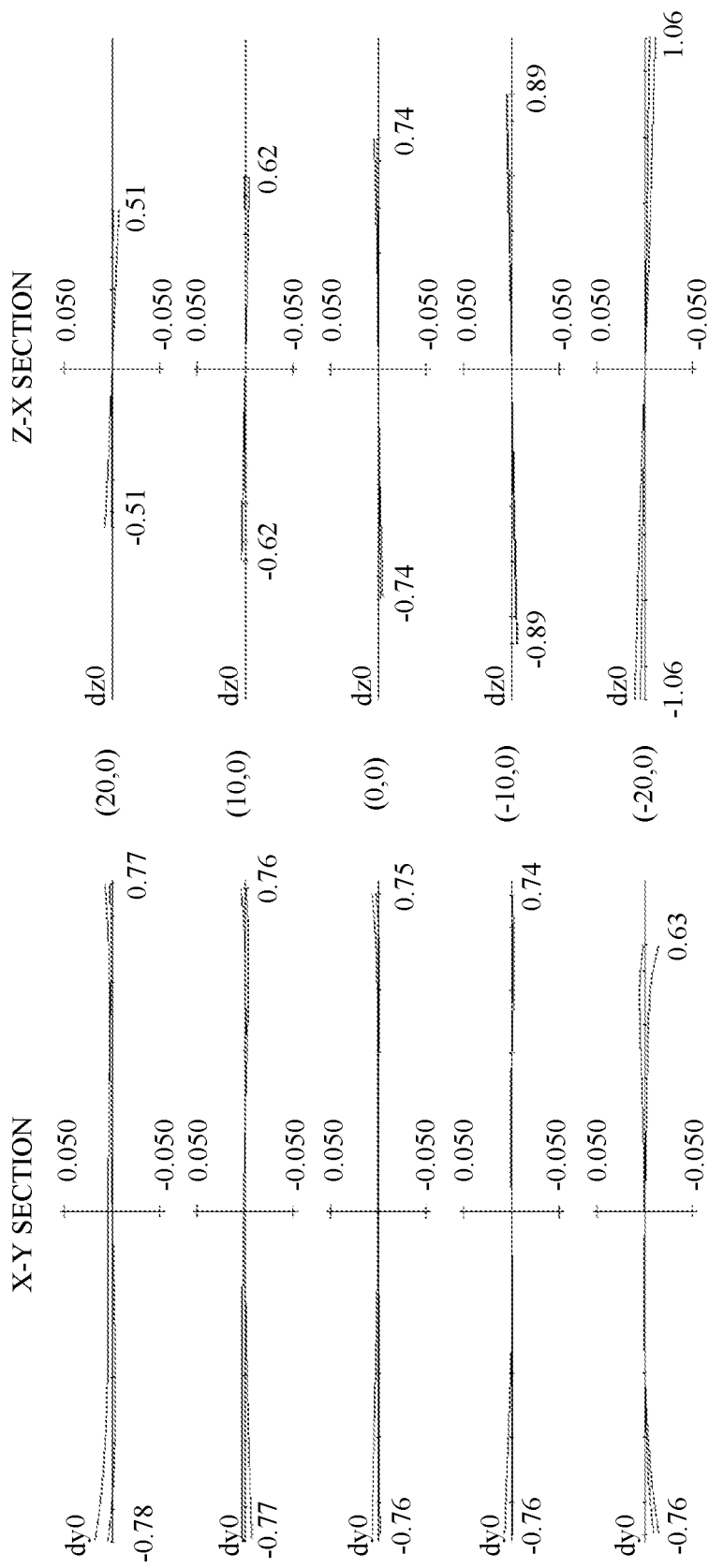
FIG. 6 is a lateral aberrational diagram of the optical system according to Example 2 in the in-focus state on infinity.

FIG. 5 is an X-Y sectional view in an optical system OL according to this example in an in-focus state on infinity. FIG. 6 is a lateral aberrational diagram of the optical system OL according to this example in the in-focus state on infinity. In the lateral aberrational diagram, the numerical value shown at the center indicates (an angle of the incident light ray on the incident part T1 in the X-Y section, an angle of the incident light ray on the incident part T1 in the Z-X section), and left and right graphs show lateral aberrations at the angles of the incident light ray. A solid line represents the d-line (wavelength 587.56 nm), and a dotted line represents the g-line (wavelength 435.8 nm).

The optical system OL includes, in order from the enlargement side to the reduction side, a front unit L1 and a rear unit L2, each of which is rotationally symmetrical around the central axis OA. The front unit L1 has a transparent medium L that is rotationally symmetric about the central axis OA and has a refractive index greater than 1. The transparent medium L includes, in order from the enlargement side to the reduction side, an incident part T1, a first reflective surface R1, a second reflective surface R2, a third reflective surface R3, and an exit part T2. The incident part T1, the first reflective surface R1, the second reflective surface R2, the third reflective surface R3, and the exit part T2 each have a free-form surface with the central axis OA as a reference axis. The incident part T1 and the exited part T2 each have a refractive surface. The rear unit L2 has an aspherical lens which is coaxial with the central axis OA and has a convex surface facing the side opposite to the image, and an aperture stop (diaphragm) SP.

The incident light from the incident part T1 intersects the central axis OA and enters the first reflective surface R1. The reflected light from the first reflective surface R1 intersects the central axis OA and enters the second reflective surface R2. The reflected light from the second reflective surface R2 enters the third reflective surface R3 without intersecting the central axis OA. The reflected light from the third reflective surface R3 is exited from the exit part T2.

The position P2 where the principal ray OB intersects the second reflective surface R2 is located on the image side of the position P1 where the principal ray OB intersects the first reflective surface R1. The position P1 where the principal ray OB intersects the first reflective surface R1 is located on the image side of the position P3 where the principal ray OB intersects the third reflective surface R3 that introduces the reflected light to the exit part T2. The incident part T1 is disposed between the first reflective surface R1 and the third reflective surface R3 in the Y-axis direction.

The light emitted from the exit part T2 passes through the rear unit L2 and forms an annular image at a position deviated from the central axis OA of the image plane IP.

The light ray OBU incident on the incident part T1 from the side opposite to the image of the principal ray OB is imaged inside the position where the principal ray OB is imaged on the image plane IP. The ray OBL incident on the incident part T1 from the image side of the principal ray OB is imaged outside the position where the principal ray OB is imaged on the image plane IP.

The incident light from the incident part T1 forms an intermediate image once in the X-Y section and intermediate images twice in the Z-X section.

Example 3

Figure 7:
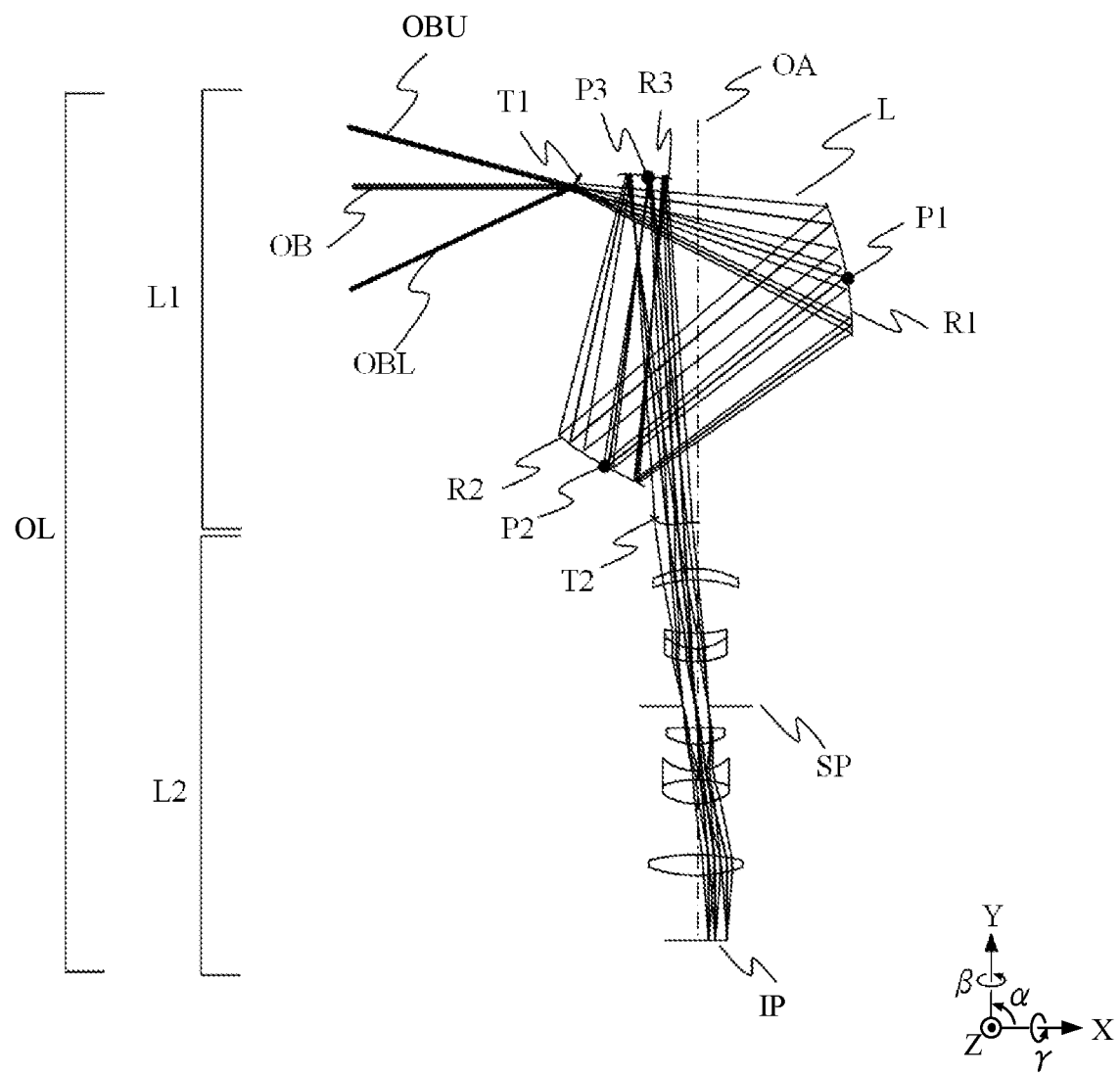
FIG. 7 is an X-Y sectional view in an optical system according to Example 3 in an in-focus state on infinity.
Figure 8:
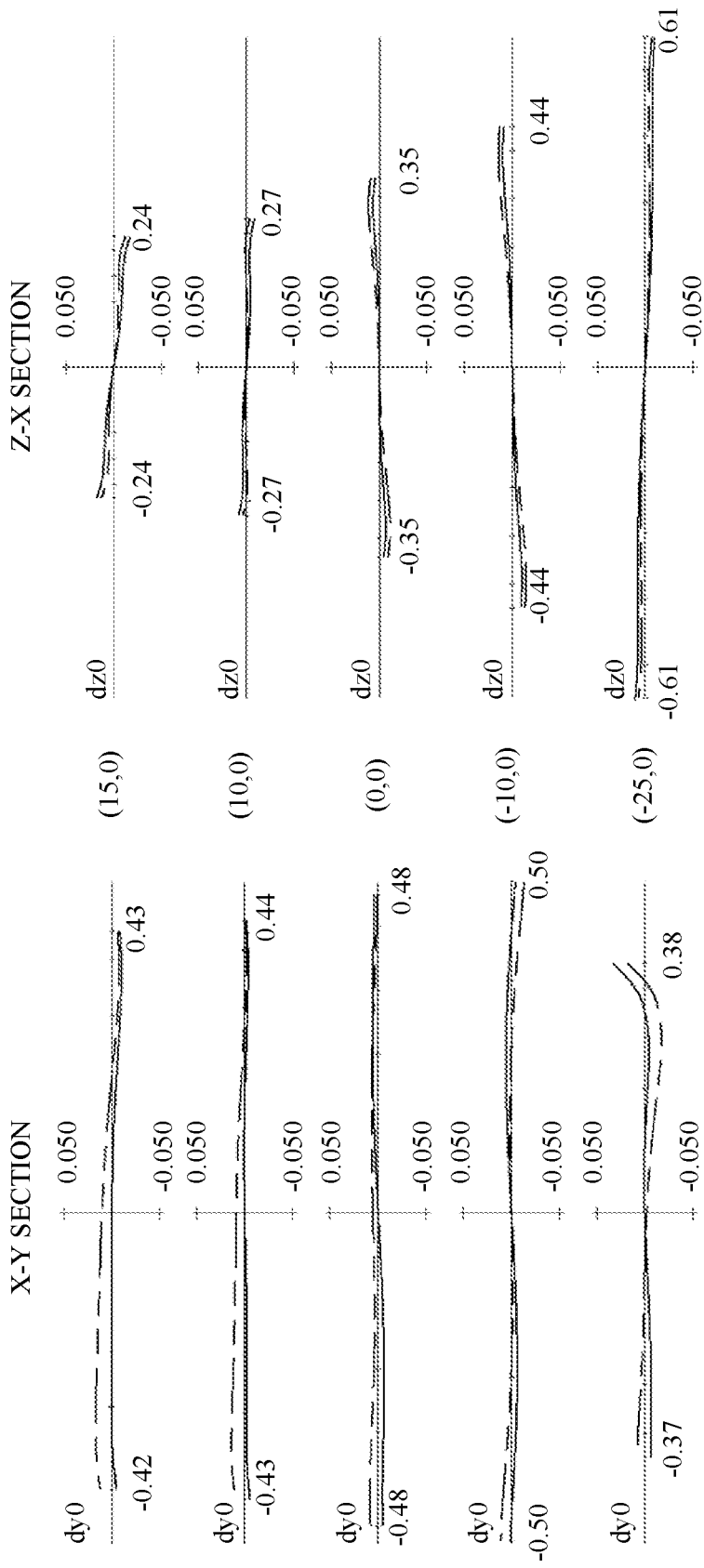
FIG. 8 is a lateral aberrational diagram of the optical system according to Example 3 in the in-focus state on infinity.

FIG. 7 is an X-Y sectional view in an optical system OL according to this example in an in-focus state on infinity. FIG. 8 is a lateral aberrational diagram of the optical system OL according to this example in the in-focus state on infinity. In the lateral aberrational diagram, the numerical value shown at the center indicates (an angle of the incident light ray on the incident part T1 in the X-Y section, an angle of the incident light ray on the incident part T1 in the Z-X section), and left and right graphs show lateral aberrations at the angles of the incident light ray. A solid line represents the d-line (wavelength 587.56 nm), and a dotted line represents the g-line (wavelength 435.8 nm).

The optical system OL includes, in order from the enlargement side to the reduction side, a front unit L1 and a rear unit L2, each of which is rotationally symmetrical around the central axis OA. The front unit L1 has a transparent medium L that is rotationally symmetric about the central axis OA and has a refractive index greater than 1. The transparent medium L includes, in order from the enlargement side to the reduction side, an incident part T1, a first reflective surface R1, a second reflective surface R2, a third reflective surface R3, and an exit part T2. The incident part T1, the first reflective surface R1, the second reflective surface R2, the third reflective surface R3, and the exit part T2 each have a free-form surface with the central axis OA as a reference axis. The incident part T1 and the exited part T2 each have a refractive surface. The rear unit L2 has an aspherical lens which is coaxial with the central axis OA and has a convex surface facing the side opposite to the image, and an aperture stop (diaphragm) SP.

The incident light from the incident part T1 intersects the central axis OA and enters the first reflective surface R1. The reflected light from the first reflective surface R1 intersects the central axis OA and enters the second reflective surface R2. The reflected light from the second reflective surface R2 enters the third reflective surface R3 without intersecting the central axis OA. The reflected light from the third reflective surface R3 is exited from the exit part T2.

The position P2 where the principal ray OB intersects the second reflective surface R2 is located on the image side of the position P1 where the principal ray OB intersects the first reflective surface R1. The position P1 where the principal ray OB intersects the first reflective surface R1 is located on the image side of the position P3 where the principal ray OB intersects the third reflective surface R3 that introduces the reflected light to the exit part T2. The incident part T1 is disposed between the first reflective surface R1 and the third reflective surface R3 in the Y-axis direction.

The light emitted from the exit part T2 passes through the rear unit L2 and forms an annular image at a position deviated from the central axis OA of the image plane IP.

The light ray OBU incident on the incident part T1 from the side opposite to the image of the principal ray OB is imaged inside the position where the principal ray OB is imaged on the image plane IP. The ray OBL incident on the incident part T1 from the image side of the principal ray OB is imaged outside the position where the principal ray OB is imaged on the image plane IP.

The incident light from the incident part T1 forms an intermediate image once in the X-Y section and intermediate images twice in the Z-X section.

Example 4

Figure 9:
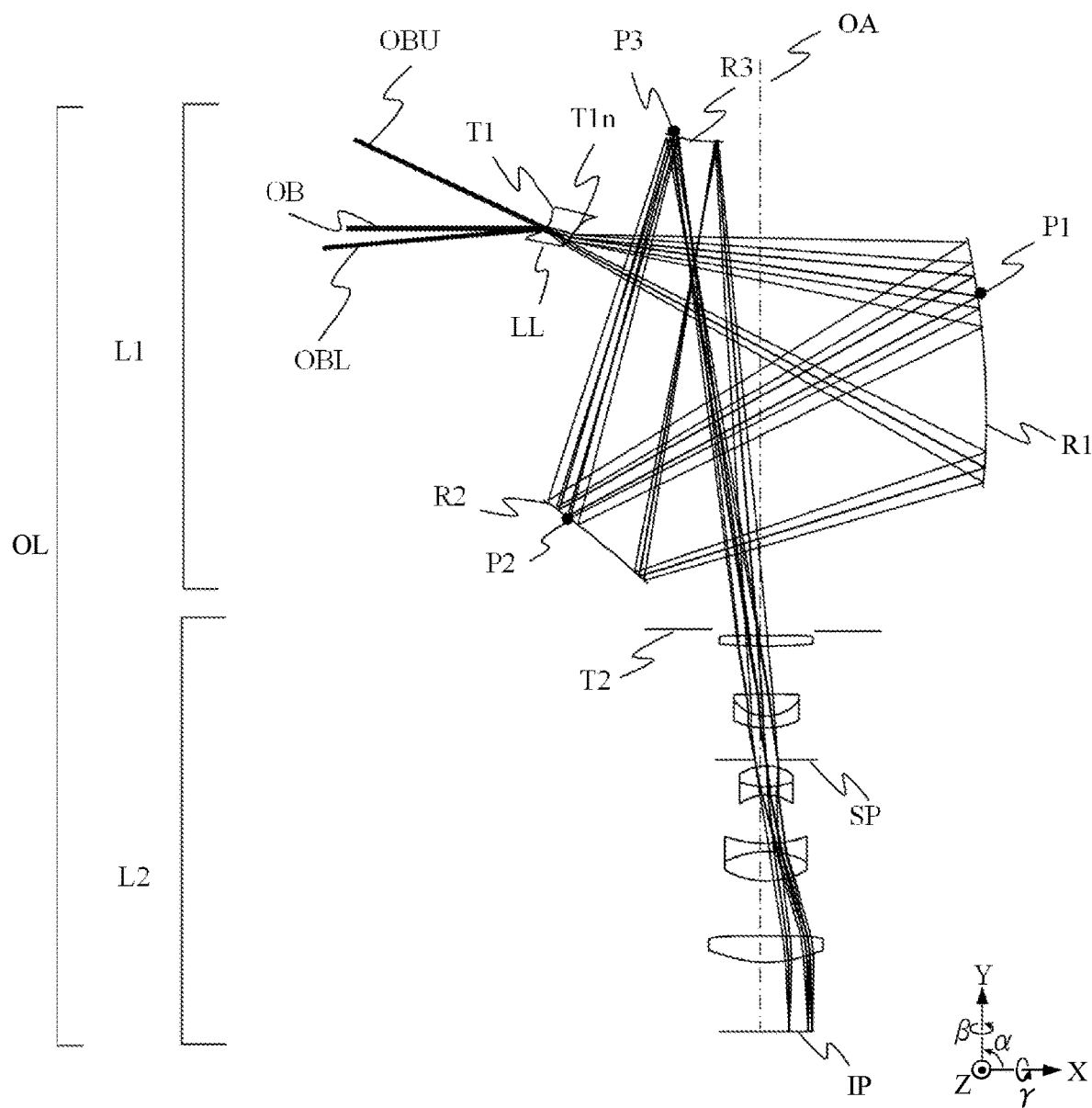
FIG. 9 is an X-Y sectional view in an optical system according to Example 4 in an in-focus state on infinity.
Figure 10:
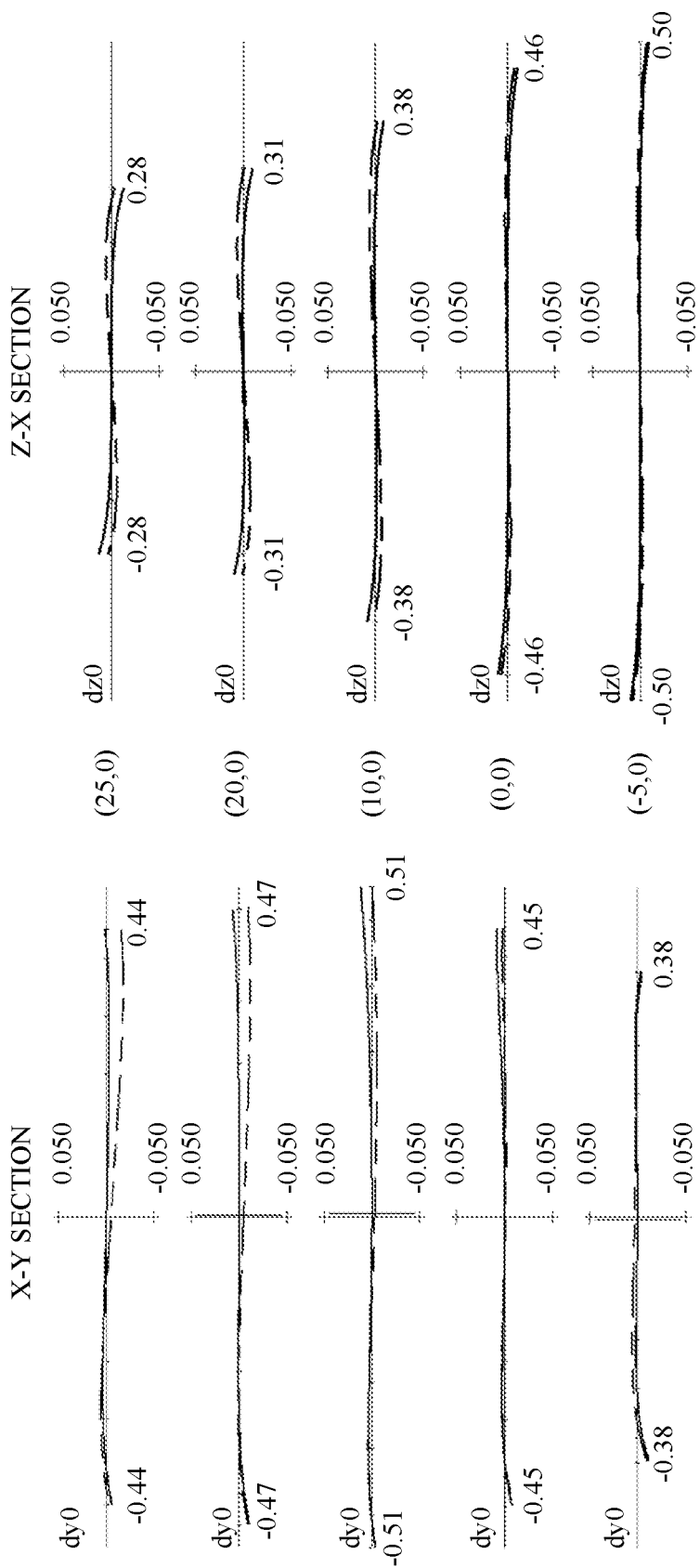
FIG. 10 is a lateral aberrational diagram of the optical system according to Example 4 in the in-focus state on infinity.

FIG. 9 is an X-Y sectional view in an optical system OL according to this example in an in-focus state on infinity. FIG. 10 is a lateral aberrational diagram of the optical system OL according to this example in the in-focus state on infinity. In the lateral aberrational diagram, the numerical value shown at the center indicates (an angle of the incident light ray on the incident part T1 in the X-Y section, an angle of the incident light ray on the incident part T1 in the Z-X section), and left and right graphs show lateral aberrations at the angles of the incident light ray. A solid line represents the d-line (wavelength 587.56 nm), and a dotted line represents the g-line (wavelength 435.8 nm).

The optical system OL includes, in order from the enlargement side to the reduction side, a front unit L1 and a rear unit L2, each of which is rotationally symmetrical around the central axis OA. The front unit L1 includes a shell body that defines a predetermined internal space, and includes an annular transparent medium LL based on the central axis OA, a first reflective surface R1, a second reflective surface R2, a third reflective surface R3, and has an exit unit T2. The transparent medium LL has an incident part T1 and an exited part T1n. The incident part T1, the exit part T1n, the first reflective surface R1, the second reflective surface R2, and the third reflective surface R3 each have a free-form surface with the central axis OA as a reference axis. The exit part T2 has a Y-coordinate value that is equivalent with the R1 surface of the lens G1 disposed on the most positive side in the Y-axis direction in the rear unit L2. The rear unit L2 has an aspherical lens which coaxial with the central axis OA and has a convex surface facing the side opposite to the image, and an aperture stop (diaphragm) SP.

The incident light from the incident part T1 enters the exit part Tn1. The light emitted from the exit part Tn1 intersects the central axis OA and enters the first reflective surface R1. The reflected light from the first reflective surface R1 intersects the central axis OA and enters the second reflective surface R2. The reflected light from the second reflective surface R2 enters the third reflective surface R3 without intersecting the central axis OA. The reflected light from the third reflective surface R3 is exited from the exit part T2.

The position P2 where the principal ray OB intersects the second reflective surface R2 is located on the image side of the position P1 where the principal ray OB intersects the first reflective surface R1. The position P1 where the principal ray OB intersects the first reflective surface R1 is located on the image side of the position P3 where the principal ray OB intersects the third reflective surface R3 that introduces the reflected light to the exit part T2. The incident part T1 is disposed between the first reflective surface R1 and the third reflective surface R3 in the Y-axis direction.

The light emitted from the exit part T2 passes through the rear unit L2 and forms an annular image at a position deviated from the central axis OA of the image plane IP.

The light ray OBU incident on the incident part T1 from the side opposite to the image of the principal ray OB is imaged inside the position where the principal ray OB is imaged on the image plane IP. The ray OBL incident on the incident part T1 from the image side of the principal ray OB is imaged outside the position where the principal ray OB is imaged on the image plane IP.

The incident light from the incident part T1 forms an intermediate image once in the X-Y section and intermediate images twice in the Z-X section.

Example 5

Figure 11:
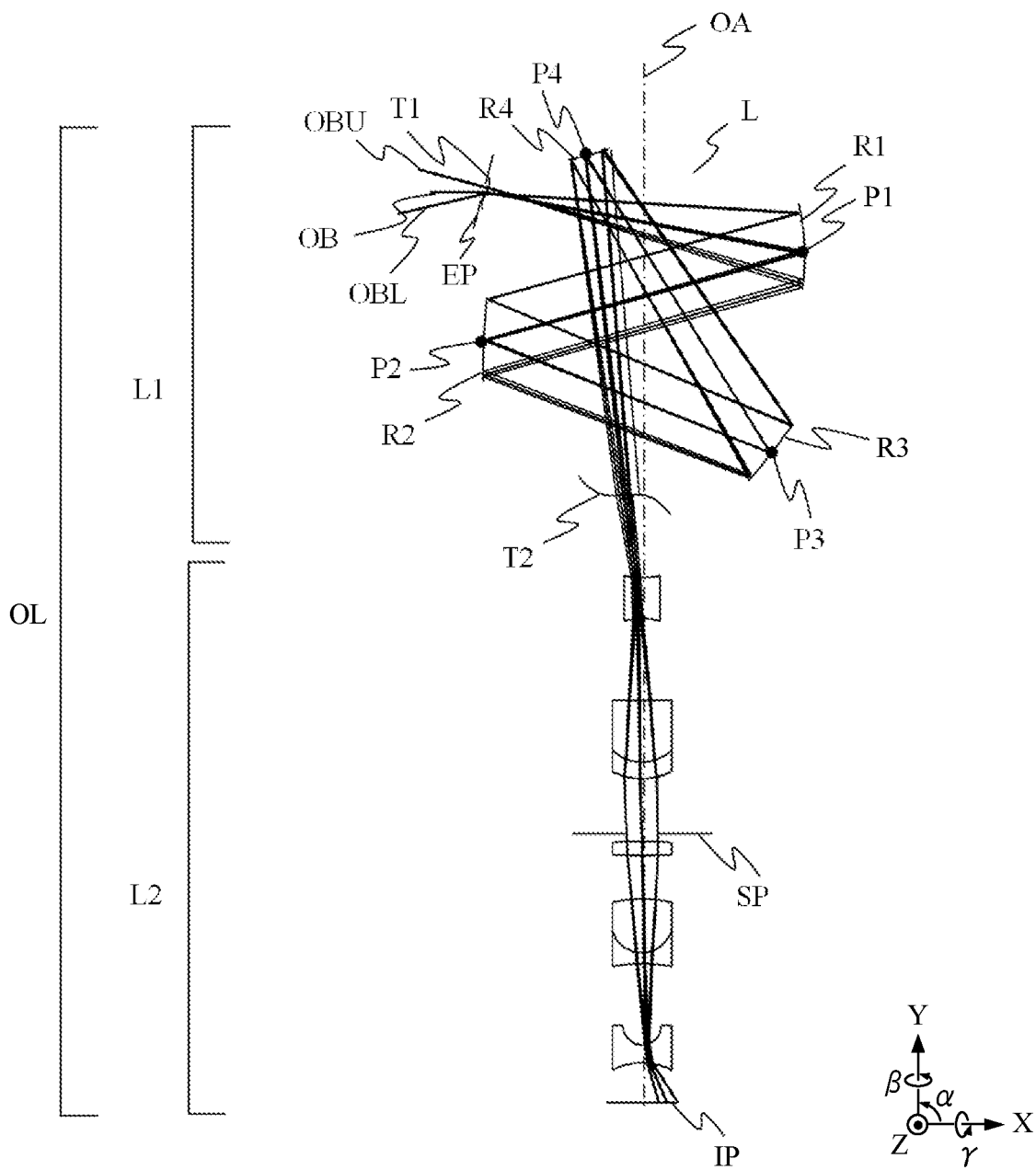
FIG. 11 is an X-Y sectional view in an optical system according to Example 5 in an in-focus state on infinity.
Figure 12:
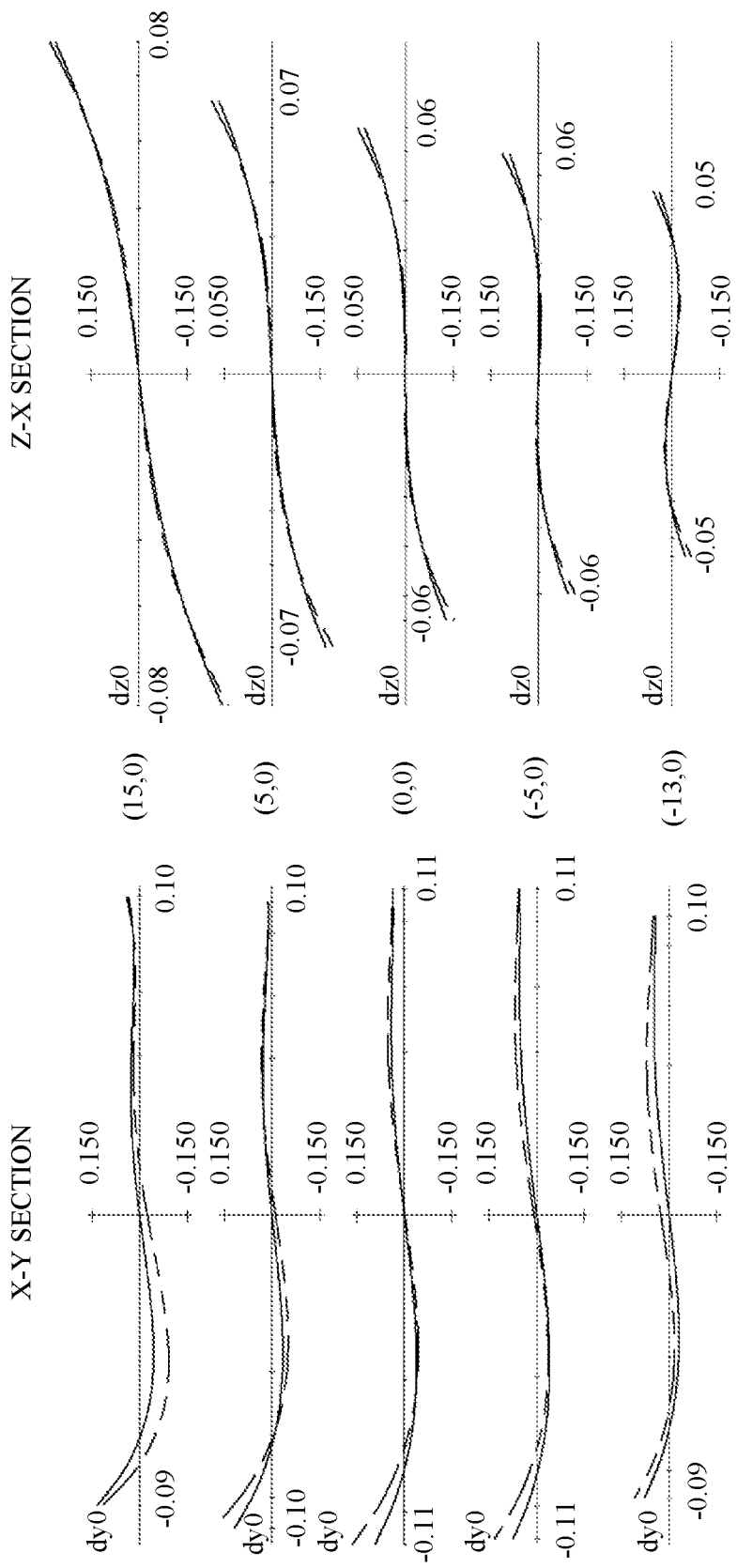
FIG. 12 is a lateral aberrational diagram of the optical system according to Example 5 in the in-focus state on infinity.

FIG. 11 is an X-Y sectional view in an optical system OL according to this example in an in-focus state on infinity. FIG. 12 is a lateral aberrational diagram of the optical system OL according to this example in the in-focus state on infinity. In the lateral aberrational diagram, the numerical value shown at the center indicates (an angle of the incident light ray on the incident part T1 in the X-Y section, an angle of the incident light ray on the incident part T1 in the Z-X section), and left and right graphs show lateral aberrations at the angles of the incident light ray. A solid line represents the d-line (wavelength 587.56 nm), and a dotted line represents the g-line (wavelength 435.8 nm).

The optical system OL includes, in order from the enlargement side to the reduction side, a front unit L1 and a rear unit L2, each of which is rotationally symmetrical around the central axis OA. The front unit L1 has a transparent medium L that is rotationally symmetric about the central axis OA and has a refractive index greater than 1. The transparent medium L includes, in order from the enlargement side to the reduction side, an incident part T1, a first reflective surface R1, a second reflective surface R2, a third reflective surface R3, a fourth reflective surface R4, and an exit part T2. The incident part T1, the first reflective surface R1, the second reflective surface R2, the third reflective surface R3, the fourth reflective surface R4, and the exit part T2 each have a free-form surface with the central axis OA as a reference axis. The incident part T1 and the exited part T2 each have a refractive surface. The rear unit L2 has an aspherical lens which is coaxial with the central axis OA and has a convex surface facing the side opposite to the image, and an aperture stop (diaphragm) SP.

The incident light from the incident part T1 intersects the central axis OA and enters the first reflective surface R1. The reflected light from the first reflective surface R1 intersects the central axis OA and enters the second reflective surface R2. The reflected light from the second reflective surface R2 intersects the central axis OA and enters the third reflective surface R3. The reflected light from the third reflective surface R3 intersects the central axis OA and enters the fourth reflective surface R4. The reflected light from the fourth reflective surface R4 is exited from the exit part T2.

The position P2 where the principal ray OB intersects the second reflective surface R2 is located on the image side of the position P1 where the principal ray OB intersects the first reflective surface R1. The position P3 where the principal ray OB intersects the third reflective surface R3 is located on the image side of the intersecting position P2 where the principal ray OB intersects the second reflective surface R2. The position P1 where the principal ray OB intersects the first reflective surface R1 is located on the image side of the position P4 where the principal ray OB intersects the fourth reflective surface R4 that introduces the reflected light to the exit part T2. The incident part T1 is disposed between the first reflective surface R1 and the fourth reflective surface R4 in the Y-axis direction.

The light emitted from the exit part T2 passes through the rear unit L2 and forms an annular image at a position deviated from the central axis OA of the image plane IP.

The light ray OBU incident on the incident part T1 from the side opposite to the image of the principal ray OB is imaged outside the position where the principal ray OB is imaged on the image plane IP. The ray OBL incident on the incident part T1 from the image side of the principal ray OB is imaged inside the position where the principal ray OB is imaged on the image plane IP.

In the optical system OL according to each example, the distortion and the like may be electronically corrected. The optical system OL according to each example may have an optical element, such as a low-pass filter or an IR cut filter, in front of the image plane IP, if necessary. The optical system OL according to each example may have a diffractive optical element.

In the optical system OL according to each example, part of the rear unit L2 may be set to a focus unit that moves in the Y-axis direction during focusing from an infinity object to a short-distance object. The optical system OL may be used as the focus unit.

The optical system OL according to each example may be used for a projection apparatus configured to project an image on the enlargement side in which a transmission type liquid crystal or the like is disposed on the image plane IP and a light source is disposed on the reduction side. In this case, the optical system OL according to each example includes, in order from the reduction side to the enlargement side, an incident part, a first reflective surface, a second reflective surface, a third reflective surface, and an exit part. The exit part is rotationally symmetrical about the central axis OA. The reflected light from the first reflective surface enters the second reflective surface. The reflected light from the second reflective surface intersects the central axis OA and enters the third reflective surface. The reflected light from the third reflective surface intersects the central axis OA and enters the exit part.

Numerical examples 1 to 5 corresponding to Examples 1 to 5 will be shown below.

In surface data of each numerical example, r represents a radius of curvature of each optical surface, and d (mm) represents an axial distance (distance on the optical axis) between an m-th surface and a (m+1)-th surface, where m is a surface number counted from the light incident side. nd represents a refractive index of each optical element for the d-line, and vd represents an Abbe number of the optical element. The Abbe number vd of a certain material is expressed as follows where Nd, NF, and NC are refractive indexes for the d-line (587.6 nm), F-line (486.1 nm), and C-line (656.3 nm) in the Fraunhofer line.

$$Nd=(Nd-1)/(NF-NC)$$

The eccentricity is represented as an amount of eccentricity from the origin O. X, Y, and Z represent amounts of eccentricity in the X-axis, Y-axis, and Z-axis directions, respectively. α and β are slopes centered on the X axis and the Y axis, respectively, and the counterclockwise direction is positive with respect to the positive direction of each axis.

When the optical surface is an aspherical surface, a symbol * is added to the right side of the surface number. The aspherical shape is expressed as follows:

$$X=(Y^2/R)/[1+\{1-(1+K)(Y/R)^2\}^{1/2}]+A4Y^4+A6Y^6+A8Y^8+A10Y^{10}+A12Y^{12}$$

where the X axis is set to the basis, the Y axis is set in the perpendicular direction to the X axis, the light traveling direction is set positive, R is a paraxial radius of curvature, K is the conical constant, and A4 to A12 are aspherical coefficients of respective orders. "e±XX" in each aspherical surface coefficient means "$\times 10^{\pm XX}$".

The free-form surface is a rotationally symmetric aspherical surface given by the following definition. The following curve is defined on the X-Y coordinate plane through the origin.

$$X=(Y^2/RY)/[1+\{1-(C1+1)Y^2/RY^2\}^{1/2}]+C2Y+C3Y^2+C4Y^3+C5Y^4$$

A curve F(Y) is defined by rotating the above curve by an angle θ (°) where the clockwise direction is set positive while facing the positive direction of the Z axis. This curve F(Y) also passes through the origin in the X-Z coordinate system.

A plane of rotational symmetry is set to a free-form surface, which is made by translating the curve F(Y) by a distance R in the positive direction of the X axis (in negative direction of the Z axis when negative), and then by rotating the translated curve around the Y axis.

From this definition, the Y axis is an axis of the free-form surface. Here, RY is a radius of curvature of a spherical term in the X-Y section, C1 is a conical constant, and C2 to C5 are aspherical coefficients. "e–x" means $10^{-x}$. REF is a reflective surface, and RFS is a free-form surface.

Numerical Example 1

| Horizontal angle of view | | 360° |
|---|---|---|
| Vertical angle of view | | 30° |
| Image circle | φ12.17~φ23.00 mm | |
| Unit mm | | |

Surface data

| Surface number | r | d | nd | vd | Eccentricity |
|---|---|---|---|---|---|
| 1(entrance pupil plane) | ∞ | 0.00 | | | eccentricity[1] |
| 2 | RFS[1] | 0.00 | 1.51630 | 64.1 | eccentricity[2] |
| 3 | RFS[2] | 0.00 | 1.51630 | 64.1 | eccentricity[3] (REF) |
| 4 | RFS[3] | 0.00 | 1.51630 | 64.1 | eccentricity[4] (REF) |
| 5 | RFS[4] | 0.00 | 1.51630 | 64.1 | eccentricity[5] (REF) |
| 6 | RFS[5] | 0.00 | | | eccentricity[6] |
| 7* | 18.573 | 2.50 | 1.59282 | 68.6 | eccentricity[7] |
| 8 | 23.519 | 12.00 | | | |
| 9* | −33.940 | 4.54 | 1.58313 | 59.4 | |
| 10 | −11.177 | 3.00 | 1.72916 | 54.7 | |
| 11 | −18.559 | 10.00 | | | |
| 12(diaphragm) | ∞ | 4.22 | | | |

-continued

| | | | | |
|---|---|---|---|---|
| 13 | 37.780 | 3.01 | 1.72342 | 38.0 |
| 14 | −51.061 | 2.00 | 1.54072 | 47.2 |
| 15 | 52.394 | 4.86 | | |
| 16 | 132.765 | 2.00 | 1.84666 | 23.8 |
| 17 | 19.981 | 6.48 | 1.49700 | 81.5 |
| 18 | −33.172 | 10.90 | | |
| 19 | 117.249 | 6.38 | 1.77250 | 49.6 |
| 20 | −35.058 | 15.84 | | |
| Image plane | ∞ | | | |

Aspheric data

7th surface

K = 0.00000e+000 A4 = −6.24766e−005 A6 = 3.16459e−007 A8 = −1.51680e−009

9th surface

K = 0.00000e+000 A4 = −3.65853e−005 A6 = 2.46623e−007 A8= −3.35008e−010

RFS[1]

| | |
|---|---|
| RY | inf |
| θ | 141.380 |
| R | −46.815 |
| C3 | 3.719e−002 |
| C4 | −3.498e−003 |
| C5 | 6.655e−004 |

RFS[2]

| | |
|---|---|
| RY | −171.445 |
| θ | −2.432 |
| R | 51.357 |
| C3 | −2.764e−004 |
| C4 | 5.749e−006 |
| C5 | −1.297e−007 |

RFS[3]

| | |
|---|---|
| RY | inf |
| θ | −128.749 |
| R | −43.288 |
| C3 | 2.036e−004 |
| C4 | −3.640e−005 |
| C5 | 1.043e−006 |

RFS[4]

| | |
|---|---|
| RY | 1577.980 |
| θ | 91.988 |
| R | 10.663 |
| C3 | −2.582e−004 |
| C4 | 6.439e−006 |
| C5 | 2.587e−008 |

RFS[5]

| | |
|---|---|
| RY | inf |
| θ | −91.024 |
| R | −12.885 |
| C3 | −1.522e−002 |
| C4 | 8.446e−004 |
| C5 | −3.277e−005 |

Eccentricity[1]

| | | | | | | |
|---|---|---|---|---|---|---|
| X | −48.000 | Y | 0.000 | Z | 0.000 |
| α | 0.000 | β | 0.000 | | |

Eccentricity[2]

| | | | | | | |
|---|---|---|---|---|---|---|
| X | −46.815 | Y | 0.000 | Z | 0.000 |
| α | 141.380 | β | 0.000 | | |

Eccentricity[3]

| | | | | | | |
|---|---|---|---|---|---|---|
| X | 51.357 | Y | −44.088 | Z | 0.000 |
| α | −2.432 | β | 0.000 | | |

-continued

| | | Eccentricity[4] | | | | |
|---|---|---|---|---|---|---|
| | X | −43.288 | Y | −58.272 | Z | 0.000 |
| | α | −128.749 | β | 0.000 | | |

| | | Eccentricity[5] | | | | |
|---|---|---|---|---|---|---|
| | X | 10.663 | Y | 4.121 | Z | 0.000 |
| | α | 91.988 | β | 0.000 | | |

| | | Eccentricity[6] | | | | |
|---|---|---|---|---|---|---|
| | X | −12.885 | Y | −75.000 | Z | 0.000 |
| | α | −91.024 | β | 0.000 | | |

| | | Eccentricity[7] | | | | |
|---|---|---|---|---|---|---|
| | X | 0.00 | Y | −85.000 | Z | 0.000 |
| | α | −90.00 | β | 0.000 | | |

Numerical Example 2

| Horizontal angle of view | | 360° |
|---|---|---|
| Vertical angle of view | | 40° |
| Image circle | φ10.91~23.00 mm | |
| Unit mm | | |

| Surface data | | | | | |
|---|---|---|---|---|---|
| Surface number | r | d | nd | vd | Eccentricity |
| 1(entrance pupil plane) ∞ | | 0.00 | | | eccentricity[1] |
| 2 | RFS[1] | 0.00 | 1.51630 | 64.1 | eccentricity[2] |
| 3 | RFS[2] | 0.00 | 1.51630 | 64.1 | eccentricity[3] (REF) |
| 4 | RFS[3] | 0.00 | 1.51630 | 64.1 | eccentricity[4] (REF) |
| 5 | RFS[4] | 0.00 | 1.51630 | 64.1 | eccentricity[5] (REF) |
| 6 | RFS[5] | 0.00 | | | eccentricity[6] |
| 7* | 19.632 | 2.50 | 1.48749 | 70.2 | eccentricity[7] |
| 8 | 42.909 | 12.00 | | | |
| 9* | −40.608 | 4.89 | 1.58313 | 59.4 | |
| 10 | −11.011 | 3.00 | 1.80400 | 46.6 | |
| 11 | −18.626 | 10.00 | | | |
| 12(diaphragm) | ∞ | 4.41 | | | |
| 13 | 51.200 | 3.49 | 1.48749 | 70.2 | |
| 14 | −21.289 | 2.00 | 1.61340 | 44.3 | |
| 15 | 73.744 | 4.74 | | | |
| 16 | 136.267 | 2.00 | 1.80400 | 46.6 | |
| 17 | 19.996 | 7.39 | 1.48749 | 70.2 | |
| 18 | −22.654 | 10.65 | | 70.2 | |
| 19 | 74.422 | 8.25 | 1.48749 | | |
| 20 | −26.557 | 15.82 | | | |
| Image plane | ∞ | | | | |

Aspheric data

7th surface

K = 0.00000e+000 A4 = −8.86024e−005 A6 = 1.87337e−007 A8 = −1.06684e−009

9th surface

K = 0.00000e+000 A4 = 2.01035e−006 A6 = −8.02132e−009 A8 = 2.41120e−009

| RFS[2] | |
|---|---|
| RY | inf |
| θ | −223.807 |
| R | −48.310 |
| C3 | 4.237e−002 |
| C4 | −4.040e−003 |
| C5 | 7.171e−004 |

| | | | |
|---|---|---|---|
| | RFS[3] | | |
| RY | 163.275 | | |
| θ | −181.803 | | |
| R | 46.305 | | |
| C3 | 4.231e−004 | | |
| C4 | 2.766e−006 | | |
| C5 | 19 9.612e−008 | | |
| | RFS[4] | | |
| RY | inf | | |
| θ | −127.709 | | |
| R | −40.829 | | |
| C3 | 8.603e−004 | | |
| C4 | −2.139e−005 | | |
| C5 | 7.221e−007 | | |
| | RFS[5] | | |
| RY | 1797.148 | | |
| θ | −89.136 | | |
| R | 15.959 | | |
| C3 | −4.691e−004 | | |
| C4 | 1.536e−005 | | |
| C5 | 3.838e−008 | | |
| | RFS[6] | | |
| RY | inf | | |
| θ | −90.804 | | |
| R | −6.535 | | |
| C3 | −9.649e−003 | | |
| C4 | 8.230e−004 | | |
| C5 | 1.561e−005 | | |
| | Eccentricity[1] | | |
| X −48.810 | Y 0.000 | Z | 0.000 |
| α −180.000 | β 0.000 | | |
| | Eccentricity[2] | | |
| X −48.310 | Y 0.000 | Z | 0.000 |
| α −223.807 | β 0.000 | | |
| | Eccentricity[3] | | |
| X 46.305 | Y −43.382 | Z | 0.000 |
| α −181.803 | β 0.000 | | |
| | Eccentricity[4] | | |
| X −40.829 | Y −62.408 | Z | 0.000 |
| α −127.709 | β 0.000 | | |
| | Eccentricity[5] | | |
| X 15.959 | Y 13.677 | Z | 0.000 |
| α −89.136 | β 0.000 | | |
| | Eccentricity[6] | | |
| X −6.535 | Y −79.706 | Z | 0.000 |
| α −90.804 | β 0.000 | | |
| | Eccentricity[7] | | |
| X 0.00 | Y −89.706 | Z | 0.000 |
| α −90.00 | β 0.000 | | |

Numerical Example 3

| | |
|---|---|
| Horizontal angle of view | 360° |
| Vertical angle of view | 40° |

-continued

| Image circle | φ5.87~φ14.00 mm |
| --- | --- |
| Unit mm | |

Surface data

| Surface number | r | d | nd | vd | Eccentricity |
| --- | --- | --- | --- | --- | --- |
| 1(entrance pupil plane) | ∞ | 0.00 | | | eccentricity[1] |
| 2 | RFS[1] | 0.00 | 1.51630 | 64.1 | eccentricity[2] |
| 3 | RFS[2] | 0.00 | 1.51630 | 64.1 | eccentricity[3] (REF) |
| 4 | RFS[3] | 0.00 | 1.51630 | 64.1 | eccentricity[4] (REF) |
| 5 | RFS[4] | 0.00 | 1.51630 | 64.1 | eccentricity[5] (REF) |
| 6 | RFS[5] | 0.00 | | | eccentricity[6] |
| 7* | 19.312 | 2.50 | 1.49700 | 81.5 | eccentricity[7] |
| 8 | 27.328 | 12.00 | | | |
| 9* | −40.588 | 3.42 | 1.59201 | 67.0 | |
| 10 | −10.797 | 3.00 | 1.72916 | 54.7 | |
| 11 | −16.569 | 10.00 | | | |
| 12(diaphragm) | ∞ | 4.85 | | | |
| 13 | 160.893 | 3.71 | 1.51633 | 64.1 | |
| 14 | −12.367 | 6.02 | | | |
| 15 | −10.968 | 2.00 | 1.91082 | 35.3 | |
| 16 | 22.179 | 5.38 | 1.48749 | 70.2 | |
| 17 | −13.338 | 11.41 | | | |
| 18 | 43.541 | 4.64 | 1.60311 | 60.6 | |
| 19 | −31.231 | (Variable) | | | |
| Image plane | ∞ | | | | |

Aspheric data

7th surface

K = 0.00000e+000 A4 = 1.76871e−006 A6 = −3.90605e−007 A8 = −1.19914e−009

9th surface

K = 0.00000e+000 A4 = −1.45143e−004 A6 = 3.07824e−007 A8 = −7.66685e−009

| RFS[1] | |
| --- | --- |
| RY | inf |
| θ | 132.716 |
| R | −27.956 |
| C3 | 3.553e−002 |
| C4 | −9.556e−004 |
| C5 | 9.003e−005 |

| RFS[2] | |
| --- | --- |
| RY | −142.077 |
| θ | −1.427 |
| R | 35.142 |
| C3 | −1.103e−003 |
| C4 | 7.920e−006 |
| C5 | −5.868e−008 |

| RFS[3] | |
| --- | --- |
| RY | inf |
| θ | −122.689 |
| R | −33.235 |
| C3 | −2.544e−003 |
| C4 | 4.107e−005 |
| C5 | −5.519e−008 |

| RFS[4] | |
| --- | --- |
| RY | 871.348 |
| θ | 92.632 |
| R | 16.892 |
| C3 | 1.433e−004 |
| C4 | 1.831e−005 |
| C5 | −1.452e−008 |

-continued

| RFS[5] | |
|---|---|
| RY | inf |
| θ | −86.646 |
| R | −6.371 |
| C3 | −1.040e−002 |
| C4 | 2.507e−003 |
| C5 | −1.109e−004 |

| Eccentricity[1] | | | | | |
|---|---|---|---|---|---|
| X | −35.000 | Y | 0.000 | Z | 0.000 |
| α | 132.716 | β | 0.000 | | |

| Eccentricity[2] | | | | | |
|---|---|---|---|---|---|
| X | −27.956 | Y | 0.000 | Z | 0.000 |
| α | 132.716 | β | 0.000 | | |

| Eccentricity[3] | | | | | |
|---|---|---|---|---|---|
| X | 35.142 | Y | −43.374 | Z | 0.000 |
| α | −1.427 | β | 0.000 | | |

| Eccentricity[4] | | | | | |
|---|---|---|---|---|---|
| X | −33.235 | Y | −54.630 | Z | 0.000 |
| α | −122.689 | β | 0.000 | | |

| Eccentricity 5] | | | | | |
|---|---|---|---|---|---|
| X | 16.892 | Y | 3.120 | Z | 0.000 |
| α | 92.632 | β | 0.000 | | |

| Eccentricity[6] | | | | | |
|---|---|---|---|---|---|
| X | −6.371 | Y | −76.014 | Z | 0.000 |
| α | −86.646 | β | 0.000 | | |

| Eccentricity[7] | | | | | |
|---|---|---|---|---|---|
| X | 0.00 | Y | −86.014 | Z | 0.000 |
| α | −90.00 | β | 0.000 | | |

Numerical Example 4

| | |
|---|---|
| Horizontal angle of view | 360° |
| Vertical angle of view | 40° |
| Image circle | φ11.43~φ23.00 mm |
| Unit mm | |

| Surface data | | | | | |
|---|---|---|---|---|---|
| Surface number | r | d | nd | vd | Eccentricity |
| 1(entrance pupil plane) | ∞ | 0.00 | | | eccentricity[1] |
| 2 | RFS[1] | 0.00 | 1.51630 | 64.1 | eccentricity[2] |
| 3 | RFS[2] | 0.00 | | | eccentricity[3] |
| 4 | RFS[3] | 0.00 | | | eccentricity[4] (REF) |
| 5 | RFS[4] | 0.00 | | | eccentricity[5] (REF) |
| 6 | RFS[5] | 0.00 | | | eccentricity[6] (REF) |
| 7 | ∞ | 0.00 | | | eccentricity[7] |
| 8* | −184.397 | 2.50 | 1.68948 | 31.0 | eccentricity[8] |
| 9 | −138.354 | 11.97 | | | |
| 10* | 211.046 | 5.44 | 1.48749 | 70.2 | |
| 11 | −10.310 | 3.00 | 1.95375 | 32.3 | |
| 12 | −18.336 | 7.85 | | | |
| 13(diaphragm) | ∞ | 1.48 | | | |
| 14 | 11.359 | 5.12 | 1.56732 | 42.8 | |
| 15 | −19.990 | 2.00 | 1.51742 | 52.4 | |
| 16 | 10.210 | 12.00 | | | |
| 17 | −30.401 | 2.00 | 2.00100 | 29.1 | |
| 18 | 21.357 | 7.23 | 1.48749 | 70.2 | |
| 19 | −20.716 | 13.65 | | | |
| 20* | −1165.499 | 6.60 | 1.68948 | 31.0 | |

-continued

| 21* | −27.362 | 18.81 |
|---|---|---|
| Image plane | ∞ | |

Aspheric data

8th surface

K = 0.00000e+000  A4 = 4.28709e−005  A6 = −2.69674e−007  A8 = −8.40259e−010
A5 = 2.32532e−008  A7 = 2.44021e−008

10th surface

K = 0.00000e+000  A4 = −3.78581e−005  A6 = 4.27958e−007  A8 = 1.02174e−009

20th surface

K = 0.00000e+000  A4 = 1.39152e−005  A6 = 1.66462e−008  A8 = 1.09857e−010

21st surface

K = 0.00000e+000  A4 = 2.93971e−005  A6 = −1.39480e−007  A8 = 6.21168e−010

RFS[1]

| | |
|---|---|
| RY | inf |
| θ | −229.682 |
| R | −53.400 |
| C3 | 7.957e−002 |
| C4 | −7.258e−003 |
| C5 | 9.055e−004 |

RFS[2]

| | |
|---|---|
| RY | inf |
| θ | −217.744 |
| R | −46.303 |
| C3 | −1.439e−002 |
| C4 | 6.721e−003 |
| C5 | −4.275e−004 |

RFS[3]

| | |
|---|---|
| RY | 174.029 |
| θ | −181.064 |
| R | 54.865 |
| C3 | 2.594e−004 |
| C4 | 1.051e−006 |
| C5 | 5.269e−008 |

RFS[4]

| | |
|---|---|
| RY | inf |
| θ | −129.305 |
| R | −45.940 |
| C3 | 8.214e−004 |
| C4 | −6.082e−006 |
| C5 | 3.644e−007 |

RFS[5]

| | |
|---|---|
| RY | 4258.449 |
| θ | −91.844 |
| R | −8.245 |
| C3 | −1.983e−003 |
| C4 | 6.832e−006 |
| C5 | 1.852e−006 |

Eccentricity[1]

| X | −58.000 | Y | 0.000 | Z | 0.000 |
|---|---|---|---|---|---|
| α | −180.000 | β | 0.000 | | |

Eccentricity[2]

| X | −54.510 | Y | 0.000 | Z | 0.000 |
|---|---|---|---|---|---|
| α | −229.682 | β | 0.000 | | |

Eccentricity[3]

| X | −46.303 | Y | −0.385 | Z | 0.000 |
|---|---|---|---|---|---|
| α | −217.744 | β | 0.000 | | |

-continued

| | | Eccentricity[4] | | | | |
|---|---|---|---|---|---|---|
| | X | 54.865 | Y | −47.124 | Z | 0.000 |
| | α | −181.064 | β | 0.000 | | |

| | | Eccentricity[5] | | | | |
|---|---|---|---|---|---|---|
| | X | −45.940 | Y | −73.508 | Z | 0.000 |
| | α | −129.305 | β | 0.000 | | |

| | | Eccentricity[6] | | | | |
|---|---|---|---|---|---|---|
| | X | −8.245 | Y | 21.639 | Z | 0.000 |
| | α | −91.844 | β | 0.000 | | |

| | | Eccentricity[7] | | | | |
|---|---|---|---|---|---|---|
| | X | 0.000 | Y | −100.545 | Z | 0.000 |
| | α | −90.00 | β | 0.000 | | |

| | | Eccentricity[8] | | | | |
|---|---|---|---|---|---|---|
| | X | 0.000 | Y | −100.545 | Z | 0.000 |
| | α | −90.00 | β | 0.000 | | |

Numerical Example 5

| Horizontal angle of view | | | 360° | |
|---|---|---|---|---|
| Vertical angle of view | | | 28° | |
| Image circle | φ5.98~φ13.04 mm | | | |
| Unit mm | | | | |

Surface data

| Surface number | r | d | nd | vd | Eccentricity |
|---|---|---|---|---|---|
| 1(entrance pupil plane) | ∞ | 0.00 | | | eccentricity[1] |
| 2 | RFS[1] | 0.00 | 1.51630 | 64.1 | eccentricity[2] |
| 3 | RFS[2] | 0.00 | 1.51630 | 64.1 | eccentricity[3] (REF) |
| 4 | RFS[3] | 0.00 | 1.51630 | 64.1 | eccentricity[4] (REF) |
| 5 | RFS[4] | 0.00 | 1.51630 | 64.1 | eccentricity[5] (REF) |
| 6 | RFS[5] | 0.00 | 1.51630 | 64.1 | eccentricity[6] (REF) |
| 7 | RFS[6] | 0.00 | | | eccentricity[7] |
| 8* | −21.901 | 7.38 | 1.84817 | 23.8 | eccentricity[8] |
| 9 | 10.122 | 14.93 | | | |
| 10* | −197.107 | 11.18 | 1.51756 | 63.4 | |
| 11 | −7.744 | 3.00 | 1.84666 | 23.8 | |
| 12 | −11.556 | 9.99 | | | |
| 13(diaphragm) | ∞ | 1.42 | | | |
| 14 | 70.418 | 2.50 | 2.00100 | 29.1 | |
| 15 | −242.035 | 7.93 | | | |
| 16 | 22.085 | 9.77 | 1.59282 | 68.6 | |
| 17 | −5.565 | 2.00 | 1.65412 | 39.7 | |
| 18 | 31.993 | 14.73 | | | |
| 19 | −3.465 | 3.26 | 1.90596 | 35.2 | |
| 20 | 11.640 | −5.11 | | | |
| Image plane | ∞ | | | | |

Aspheric data

8th surface

K = 0.00000e+000 A4 = 4.70493e−005 A6 = −2.34531e−004 A8 = 7.57177e−006
10th surface K = 0.00000e+000 A4 = −1.27065e−004 A6 = 5.06403e−006 A8 = 1.36756e−009

| | RFS[1] | |
|---|---|---|
| | RY | inf |
| | θ | −30.736 |
| | R | −28.408 |
| | C4 | −5.039e−002 |

-continued

| | RFS[2] | |
|---|---|---|
| RY | | 164.092 |
| θ | | −175.843 |
| R | | 28.831 |
| C3 | | 1.321e−003 |
| C4 | | 4.866e−006 |

| | RFS[3] | |
|---|---|---|
| RY | | −587.976 |
| θ | | 177.006 |
| R | | −28.379 |
| C3 | | 2.426e−004 |
| C4 | | 1.295e−006 |

| | RFS[4] | |
|---|---|---|
| RY | | −408.938 |
| θ | | −38.950 |
| R | | 23.785 |
| C4 | | 1.843e−005 |

| | RFS[5] | |
|---|---|---|
| RY | | −204.373 |
| θ | | −73.310 |
| R | | −25.436 |
| C3 | | −2.656e−004 |
| C4 | | −1.126e−005 |
| C5 | | 1.457e−006 |

| | RFS[6] | |
|---|---|---|
| RY | | inf |
| θ | | −84.347 |
| R | | −3.223 |
| C4 | | 8.387e−003 |

| | | Eccentricity[1] | | | |
|---|---|---|---|---|---|
| X | −29.908 | Y | 0.000 | Z | 0.000 |
| α | −30.736 | β | 0.000 | | |

| | | Eccentricity[2] | | | |
|---|---|---|---|---|---|
| X | −28.408 | Y | 0.000 | Z | 0.000 |
| α | −30.736 | β | 0.000 | | |

| | | Eccentricity[3] | | | |
|---|---|---|---|---|---|
| X | 28.831 | Y | −7.182 | Z | 0.000 |
| α | −175.843 | β | 0.000 | | |

| | | Eccentricity[4] | | | |
|---|---|---|---|---|---|
| X | −28.379 | Y | −26.777 | Z | 0.000 |
| α | 177.006 | β | 0.000 | | |

| | | Eccentricity[5] | | | |
|---|---|---|---|---|---|
| X | 23.785 | Y | −46.452 | Z | 0.000 |
| α | −38.950 | β | 0.000 | | |

| | | Eccentricity[6] | | | |
|---|---|---|---|---|---|
| X | −25.436 | Y | 2.244 | Z | 0.000 |
| α | −73.310 | β | 0.000 | | |

| | | Eccentricity[7] | | | |
|---|---|---|---|---|---|
| X | −3.223 | Y | −54.743 | Z | 0.000 |
| α | −84.347 | β | 0.000 | | |

| | | Eccentricity[8] | | | |
|---|---|---|---|---|---|
| X | 0.00 | Y | −69.743 | Z | 0.000 |
| α | −90.00 | β | 0.000 | | |

Table 1 below summarizes various values in each numerical example.

TABLE 1

|   | EXAMPLE | | | | |
| --- | --- | --- | --- | --- | --- |
|   | 1 | 2 | 3 | 4 | 5 |
| A | 102.624 | 108.539 | 65.953 | 139.006 | 117.86 |
| B | 343.934 | 431.423 | 277.588 | 469.269 | 334.72 |
| D | 102.714 | 96.621 | 70.284 | 109.731 | 56.800 |
| D r | 23.004 | 22.999 | 13.986 | 22.996 | 13.044 |
| f x y | −9.548 | −8.777 | −6.125 | −10.841 | 2.930 |
| f z x | 9.542 | 8.770 | 6.100 | 10.839 | −2.969 |
| f L 1 | −23.292 | −52.578 | −29.237 | −10.499 | −25.502 |
| f L 2 | 39.930 | 53.504 | 53.181 | 65.948 | 8.803 |
| A/B | 0.298 | 0.252 | 0.238 | 0.296 | 0.352 |
| D/Dr | 4.465 | 4.201 | 5.025 | 4.772 | 4.355 |
| \| f x y/f z x \| | 1.001 | 1.001 | 1.004 | 1.000 | 0.987 |
| \| f x y/f L 2 \| | 0.239 | 0.164 | 0.115 | 0.164 | 0.333 |
| \| f z x/f L 2 \| | 0.239 | 0.164 | 0.115 | 0.164 | 0.337 |

The above examples can provide a compact optical system and an image pickup apparatus, each of which can provide a 360° omnidirectional and high quality image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-010204, filed on Jan. 24, 2020 which is hereby incorporated by reference herein in its entirety.

What is claimed is:

1. An optical system comprising an incident part, a first reflective surface, a second reflective surface, a third reflective surface, and an exit part,
    wherein the incident part, the first reflective surface, the second reflective surface, the third reflective surface, and the exit part are rotationally symmetric around a central axis in an effective diameter,
    wherein incident light from the incident part intersects the central axis and enters the first reflective surface,
    wherein reflected light from the first reflective surface intersects the central axis and enters the second reflective surface,
    wherein reflected light from the second reflective surface enters the third reflective surface and
    wherein the following inequality is satisfied:

$0.01 < D/Dr < 5.80$ where D is a maximum diameter of the optical system, and Dr is a maximum diameter of an image circle.

2. The optical system according to claim 1, wherein reflected light from the third reflective surface is exited from the exit part.

3. The optical system according to claim 1, wherein each of the first reflective surface, the second reflective surface, the third reflective surface, and the exit part is rotationally symmetric around the central axis.

4. The optical system according to claim 1, wherein the following inequality is satisfied:

$0.01 < A/B < 0.37$ where A is a distance of a reference axis light ray traveling from the incident part to the first reflective surface, and B is a distance of the reference axis light ray traveling from the incident part to the exit part.

5. The optical system according to claim 1, further comprising a rear unit disposed on an image side of the exit part and including a refractive optical system that is rotationally symmetric around the central axis.

6. The optical system according to claim 5, wherein the following inequality is satisfied:

$0.05 < |fxy/fL2| < 5.00$ where a Y axis is set to the central axis, an X axis and a Z axis are respectively set to a first axis and a second axis that are orthogonal to the central axis and orthogonal to each other, fxy is a focal length of the optical system in an X-Y section, and fL2 is a focal length of the rear unit.

7. The optical system according to claim 5, wherein the following inequality is satisfied:

$0.05 < |fzx/fL2| < 5.00$ where a Y axis is set to the central axis, an X axis and a Z axis are respectively set to a first axis and a second axis that are orthogonal to the central axis and orthogonal to each other, fzx is a focal length of the optical system in a Z-X section, and fL2 is a focal length of the rear unit.

8. The optical system according to claim 5, wherein the rear unit includes a diaphragm disposed coaxially with the central axis.

9. The optical system according to claim 1, wherein a position where a reference axis light ray intersects the second reflective surface is located on an image side of a position where the reference axis light ray intersects the first reflective surface.

10. The optical system according to claim 1, wherein a position where a reference axis light ray intersects the first reflective surface is located on an image side of a position where the reference axis light ray intersects a reflective surface that introduces reflected light to the exit part.

11. The optical system according to claim 1, wherein the incident part is disposed between the first reflective surface and a reflective surface that introduces reflected light to the exit part in a direction parallel to the central axis.

12. The optical system according to claim 1, wherein the number of intermediate images in an X-Y section is different from that in a Z-X section where a Y axis is set to the central axis, an X axis and a Z axis are respectively set to a first axis and a second axis that are orthogonal to the central axis and orthogonal to each other.

13. The optical system according to claim 1, wherein the following inequality is satisfied:

$0.35 < |fxy/fzx| < 1.20$ where a Y axis is set to the central axis, an X axis and a Z axis are respectively set to a first axis and a second axis that are orthogonal to the central axis and orthogonal to each other, fxy is a focal distance of the optical system in an X-Y section, and fzx is a focal distance of the optical system in a Z-X section.

14. The optical system according to claim 1, further comprising an aperture disposed rotationally symmetrically with respect to the central axis and configured to limit light incident on the incident part in an X-Y section where a Y axis is set to the central axis, an X axis and a Z axis are respectively set to a first axis and a second axis that are orthogonal to the central axis and orthogonal to each other.

15. An optical system comprising an incident part, a first reflective surface, a second reflective surface, a third reflective surface, and an exit part,
    wherein the incident part, the first reflective surface, the second reflective surface, the third reflective surface, and the exit part are rotationally symmetric around a central axis in an effective diameter, wherein incident light from the incident part intersects the central axis and enters the first reflective surface, wherein reflected light from the first reflective surface intersects the central axis and enters the second reflective surface, wherein reflected light from the second reflective surface enters the third reflective surface, and wherein the incident part, the first reflective surface, the second reflective surface, the third reflective surface, and the exit part are provided in a transparent medium that is rotationally symmetric around the central axis and has a refractive index greater than 1.

16. An optical system comprising an incident part, a first reflective surface, a second reflective surface, a third reflective surface, and an exit part, wherein the exit part is rotationally symmetric around a central axis, wherein reflected light from the first reflective surface enters the second reflective surface, wherein reflected light from the second reflective surface intersects the central axis and enters the third reflective surface, wherein reflected light from the third reflective surface intersects the central axis and enters the exit part and wherein the following inequality is satisfied:

$$0.01 < D/Dr < 5.80$$

where D is a maximum diameter of the optical system, and Dr is a maximum diameter of an image circle.

17. The optical system according to claim 1, wherein the incident part, the first reflective surface, the second reflective surface, the third reflective surface, and the exit part are provided in a shell body that defines a predetermined internal space.

18. An image pickup apparatus comprising:
an optical system according to claim 16; and
an image sensor configured to receive an image formed by the optical system.

19. An image pickup apparatus comprising:
an optical system according to claim 1; and
an image sensor configured to receive an image formed by the optical system.

* * * * *